(12) United States Patent
Saito

(10) Patent No.: US 11,780,249 B2
(45) Date of Patent: Oct. 10, 2023

(54) PRINTER AND NON-TRANSITORY COMPUTER-READABLE MEDIUM STORING PROGRAM

(71) Applicant: BROTHER KOGYO KABUSHIKI KAISHA, Nagoya (JP)

(72) Inventor: Shingo Saito, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/731,912

(22) Filed: Apr. 28, 2022

(65) Prior Publication Data

US 2022/0348031 A1   Nov. 3, 2022

(30) Foreign Application Priority Data

Apr. 30, 2021   (JP) ................................. 2021-077415

(51) Int. Cl.
*B41J 11/42*   (2006.01)
*B41J 11/00*   (2006.01)
*B41J 2/21*   (2006.01)

(52) U.S. Cl.
CPC ........... *B41J 11/425* (2013.01); *B41J 2/2103* (2013.01); *B41J 11/0045* (2013.01)

(58) Field of Classification Search
CPC ...... B41J 11/425; B41J 2/2103; B41J 11/0045
See application file for complete search history.

(56) References Cited

U.S. PATENT DOCUMENTS

| 5,949,452 A | 9/1999 | Jones | |
|---|---|---|---|
| 2013/0271518 A1* | 10/2013 | Morita | B41J 25/308 347/8 |
| 2016/0243862 A1 | 8/2016 | Yoshida | |
| 2016/0271935 A1 | 9/2016 | Miyamoto | |
| 2019/0232679 A1 | 8/2019 | Arakane | |

FOREIGN PATENT DOCUMENTS

| JP | H10157096 A | 6/1998 |
|---|---|---|
| JP | 2006027131 A | 2/2006 |
| JP | 2009143135 A | 7/2009 |
| JP | 2016153182 A | 8/2016 |
| JP | 2016175373 A | 10/2016 |
| JP | 2019130752 A | 8/2019 |

\* cited by examiner

*Primary Examiner* — Justin Seo
(74) *Attorney, Agent, or Firm* — Scully, Scott, Murphy & Presser, PC

(57) ABSTRACT

There is provided a printer including: a printing part which is provided with: a conveyor configured to convey a medium in a conveying direction, a printing head having a plurality of nozzles from which an ink of a specified color is discharged and of which positions in the conveying direction are mutually different, the printing head being configured to discharge the ink from the plurality of nozzles to the medium so as to form dots in the medium, and a facing member configured to be capable of facing a print surface of the medium on an upstream side in the conveying direction with respect to the plurality of nozzles of the printing head; and a controller.

11 Claims, 13 Drawing Sheets

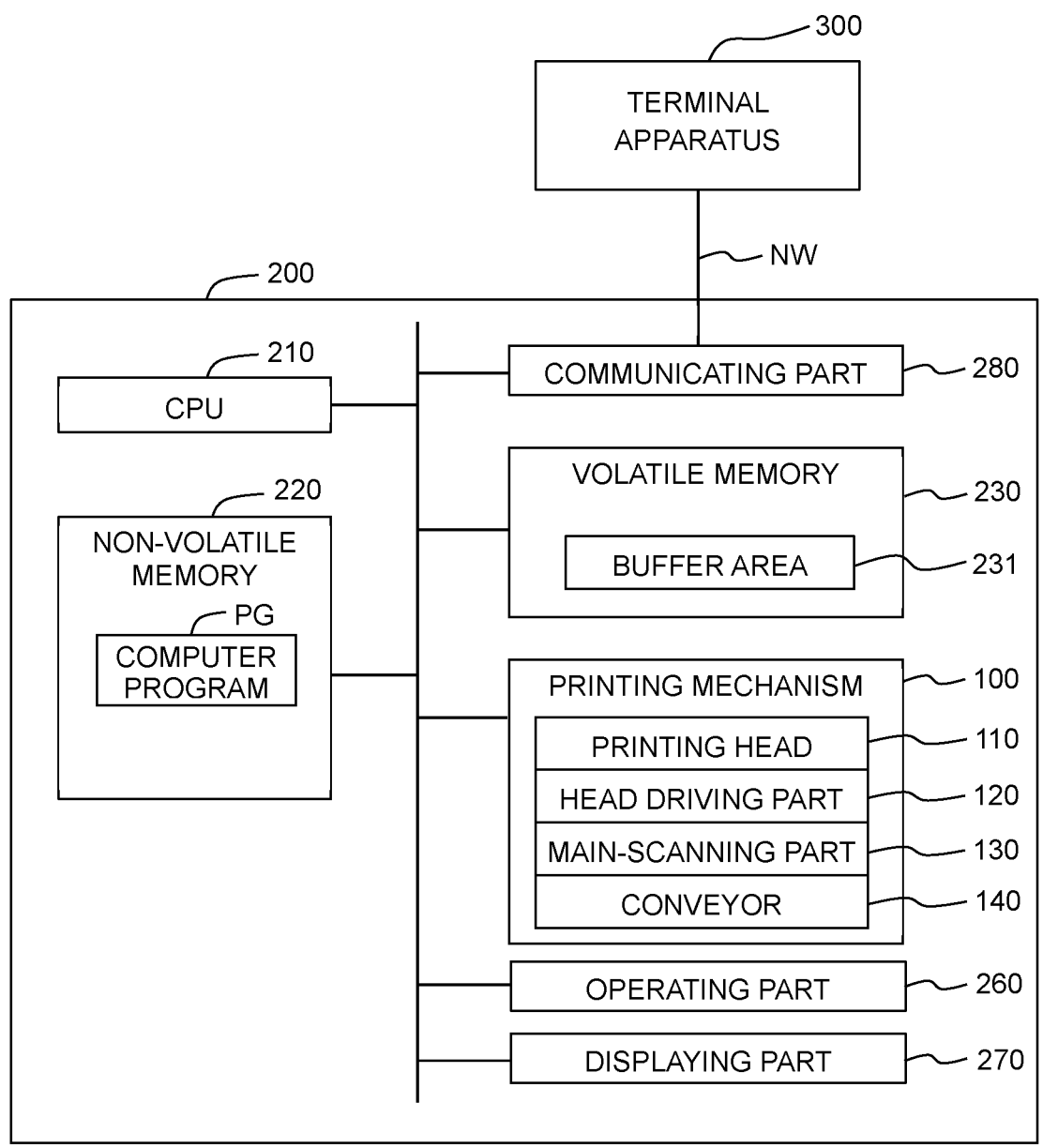

US 11,780,249 B2

PRINTER AND NON-TRANSITORY COMPUTER-READABLE MEDIUM STORING PROGRAM

CROSS REFERENCE TO RELATED APPLICATIONS

The present application claims priority from Japanese Patent Application No. 2021-077415 filed on Apr. 30, 2021, the disclosure of which is incorporated herein by reference in its entirety.

BACKGROUND

The present specification relates to a controller of a printing part provided with a printing head which has a plurality of nozzles and a conveyor which is configured to convey a medium in a conveying direction relative to the printing head.

In a case that a publicly known printer performs printing by performing a pass processing a plurality of times (a plurality of pass processings), the publicly known printer performs, by two pass processings, the printing of a partial area in the vicinity of a boundary between band areas each of which is printed by one of the pass processings. With this, the publicly known printer suppress such a situation that a banding becomes conspicuous in the vicinity of the boundary between the band areas. This printer is provided with a pressing member arranged on the upstream side in the conveying direction with respect to the plurality of nozzles of the printing head and configured to press the sheet from a side of a print surface.

SUMMARY

The present specification discloses a technique of improving the image quality of a print image by a printing part provided with a facing member facing a print surface of a sheet (for example, the pressing member as describe above).

The technique disclosed in the present specification can be realized as an aspect as follows.

According to an aspect of the present disclosure, there is provided a printer including: a printing part and a controller. The printing part includes: a conveyor configured to convey a medium in a conveying direction; a printing head having a plurality of nozzles from which an ink of a specified color is discharged and of which positions in the conveying direction are mutually different, the printing head being configured to discharge the ink from the plurality of nozzles to the medium so as to form dots in the medium; and a facing member configured to be capable of facing a print surface of the medium on an upstream side in the conveying direction with respect to the plurality of nozzles of the printing head. The controller is configured to cause the printing part to execute a partial printing of forming the dots by the printing head and a conveyance of the medium by the conveyor alternately and a plurality of times to thereby cause the printing part to print a print image. In a case that the controller causes the printing part to print the print image, the controller is configured to execute: causing the printing head to execute a first partial printing not less than one time, the first partial printing being the partial printing executed in a state that the medium faces the facing member, causing the conveyor to convey the medium by a first conveying amount, after causing the printing head to execute the first partial print not less than one time, causing the printing head to execute a second partial printing not less than one time, after causing the conveyor to convey the medium by the first conveying amount, the second partial printing being the partial printing executed in the state that the medium faces the facing member, causing the conveyor to convey the medium by a second conveying amount, which is smaller than the first conveying amount, after causing the printing head to execute the second partial print not less than one time, causing the printing head to execute a third partial printing not less than one time, after causing the conveyor to convey the medium by the second conveying amount, the third partial printing being the partial printing executed in a state that the medium is positioned at a specified position in the conveying direction at which a predetermined position, of an end part on the upstream side in the conveying direction of the medium, faces the facing member, causing the conveyor to convey the medium, after causing the printing head to execute the third partial printing not less than one time, and then, causing the printing head to execute a fourth partial printing not less than one time, the fourth partial printing being the partial printing executed in a state that the medium does not face the facing member. A first area printed by the first partial printing includes a first normal area which is printed only by the first partial printing, and a first end area which is positioned on the upstream side in the conveying direction with respect to the first normal area and which is printed by both of the first partial printing and the second partial printing. A second area printed by the second partial printing includes the first end area, a second normal area which is positioned on the upstream side in the conveying direction with respect to the first end area and which is printed only by the second partial printing, and a second end area which is positioned on the upstream side in the conveying direction with respect to the second normal area and which is printed by both of the second partial printing and the third partial printing. A third area printed by the third partial printing includes the second end area and a third end area which is positioned on the upstream side in the conveying direction with respect to the second end area and which is printed by both of the third partial printing and the fourth partial printing. A fourth area printed by the fourth partial printing includes the third end area and a fourth normal area which is positioned on the upstream side in the conveying direction with respect to the third end area and which is printed only by the fourth partial printing. The controller is configured to execute: in a case that the second conveying amount is not less than a reference, determining a used nozzle range in the second partial printing to be a first range which is same as the used nozzle range in the first partial printing, and in a case that the second conveying amount is smaller than the reference, determining the used nozzle range in the second partial printing to be a second range which is smaller than the first range. The used nozzle range is a range in the conveying direction including nozzles, among the plurality of nozzles, which are used in the partial printing; the second range is a range not including a predetermined range which is a part on the upstream side in the conveying direction of the first range. An image as a part of the print image within an area corresponding to the predetermined range in the second partial printing is printed by the third partial printing.

According to the above-described configuration, the third partial printing is performed in the state that the medium is positioned at the specified position, namely, in the state that the predetermined position of the end part on the upstream side in the conveying direction of the medium faces the facing member. Thus, it is possible to perform the third partial printing in a state that the medium is stable (stabilized), thereby making it possible to improve the print quality. Here, in a case that the second conveying amount which is the conveying amount of the conveyance performed after the second partial printing is excessively small, the length in the conveying direction of the third area which is (to be) printed by the third partial printing becomes to be excessively small. In this case, there is such a possibility that the length in the conveying direction of the second end area which is printed by both of the second partial printing and the third partial printing and/or the length in the conveying direction of the third end area which is printed by both of the third partial printing and the fourth partial printing might not be secured. According to the above-described configuration, in a case that the second conveying amount is not less than the reference, the used nozzle range in the second partial printing is determined to be the first range, and in a case that the second conveying amount is smaller than the reference, the used nozzle range is determined to be the second range which is smaller than the first range. The second range is a range not including a predetermined range which is a part on the upstream side in the conveying direction of the first range; and an image as a part of the print image within an area corresponding to the predetermined range in the second partial printing is printed by the third partial printing. As a result, it is possible to suppress such a situation that the length in the conveying direction of the third area printed by the third partial printing becomes to be excessively small. Accordingly, since such an inconvenience that the length in the conveying direction of the second end area and/or the length in the conveying direction of the third end area is/are not be secured can be suppressed, it is possible to suppress the occurrence of such a situation that the banding is conspicuous. As described above, according to the above-described configuration, it is possible to improve the image quality of the print image by the printing part.

Note that the technique disclosed in the present specification can be realized in a various kinds of aspects; for example, the technique can be realized in aspects including: a printer; a method of controlling the printing part, a printing method; a computer program configured to realize the functions of these apparatuses and methods; a non-transitory, computer-readable medium storing the computer program therein; etc.

BRIEF DESCRIPTION OF THE DRAWINGS

FIG. 1 is a block diagram indicating the configuration of a printer.

DETAILED DESCRIPTION

A. First Embodiment

<A-1: Configuration of Printer 200>

Figure 2A:
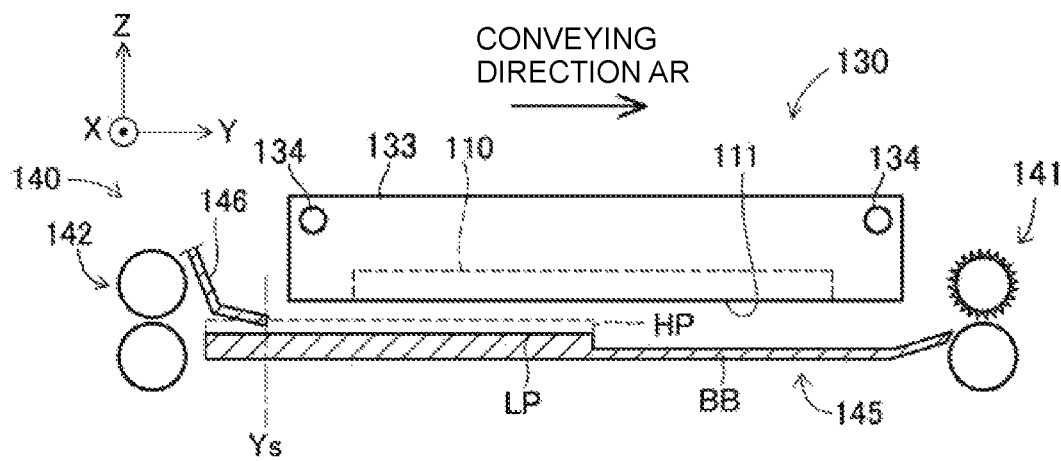
FIGS. 2A and 2B are each a view explaining the schematic configuration of a printing mechanism.

A first embodiment of the present disclosure will be explained.

A printer 200 includes, for example, a printing mechanism 100 as a printing part, a CPU 210 as a controller, a non-volatile memory 220 such as a hard disk drive, etc., a volatile memory 230 such as a RAM, etc., an operating part 260 such as a button, a touch panel, etc., via which an operation from a user is obtained, a displaying part 270 such as a liquid crystal display, etc., and a communicating part 280. The communicating part 280 includes a wired or wireless interface configured to be connected to a network NW. The printer 200 is connected to an external apparatus, such as, for example, a terminal apparatus 300 of a user, via the communicating part 280 so that the printer 200 can communicate with the external apparatus 300.

The volatile memory 230 provides a buffer area 231 which temporarily stores various kinds of intermediate data generated in a case that the CPU 210 performs a processing. A computer program PG is stored in the non-volatile memory 220. In the present embodiment, the computer program PG is a control program for controlling the printer 200. The computer program PG may be provided by being stored in the non-volatile memory 220 at a time of shipment of the printer 200. Alternatively, the computer program PG may be provided in an aspect in which the computer program PG is downloaded from a server. Still alternatively, the computer program PG may be provided in an aspect in which the computer program PG is stored in a DVD-ROM, etc. The CPU 210 executes the computer program PG so as to, for example, control the printing mechanism 100, thereby executing a printing processing (to be described later on). With this, the CPU 210 prints an image on a medium (for example, paper sheet, sheet) by controlling the printing mechanism 100.

The printing mechanism 100 is capable of forming dots on a sheet (paper sheet) M by using inks (liquid droplets) of respective colors which are cyan (C), magenta (M), yellow (Y), and black (K) to thereby perform color printing. The printing mechanism 100 includes a printing head 110, a head driving part 120, a main-scanning part 130, and a conveyor 140.

As depicted in FIG. 2A, the main-scanning part 130 includes a carriage 133 and a sliding shaft 134. The carriage 133 has the printing head 110 mounted or installed therein. The sliding shaft 134 holds the carriage 133 so that the carriage 133 can reciprocate in a main-scanning direction (X axis direction in FIG. 2A). The main-scanning part 130 uses power of a main scanning motor (not depicted in the drawings) to thereby cause the carriage 133 to reciprocate (also referred to as "scan" or "perform scanning") along the sliding shaft 134. This realizes main scanning in which the printing head 110 is caused to reciprocate in the main-scanning direction with respect to the sheet M.

The conveyor 140 conveys the sheet M in a conveying direction AR (+Y direction in FIGS. 2A and 2B) crossing the main-scanning direction while holding the sheet M. As depicted in FIG. 2A, the conveyor 140 includes an upstream roller pair 142, a downstream roller pair 141, a sheet table 145, and a plurality of pressing members 146. In the following description, an upstream side (−Y side) in the conveying direction AR is simply referred also to as an "upstream side", and a downstream side (+Y side) in the conveying direction AR is simply referred also to as a "downstream side".

The upstream roller pair 142 holds the sheet M on the upstream side (−Y side) with respect to the printing head 110, and the downstream roller pair 141 holds the sheet M on the downstream side (+Y side) with respect to the printing head 110. The sheet table 145 is arranged at a location which is between the upstream roller pair 142 and the downstream roller pair 141 and at which the sheet table 145 faces or is opposite to a nozzle formation surface 111 of the printing head 110. The downstream roller pair 141 and the upstream roller pair 142 are driven by a conveyance motor (not depicted in the drawings) to thereby convey the sheet M in the conveying direction AR.

The head driving part 120 (FIG. 1) supplies a driving signal to the printing head 110 while the main-scanning part 130 performs the main scanning of the printing head 110, thereby driving the printing head 110. The printing head 110 forms dots by ejecting or discharging the ink(s) on the sheet M, which is (being) conveyed by the conveyor 140, in accordance with the driving signal.

Figure 2B:
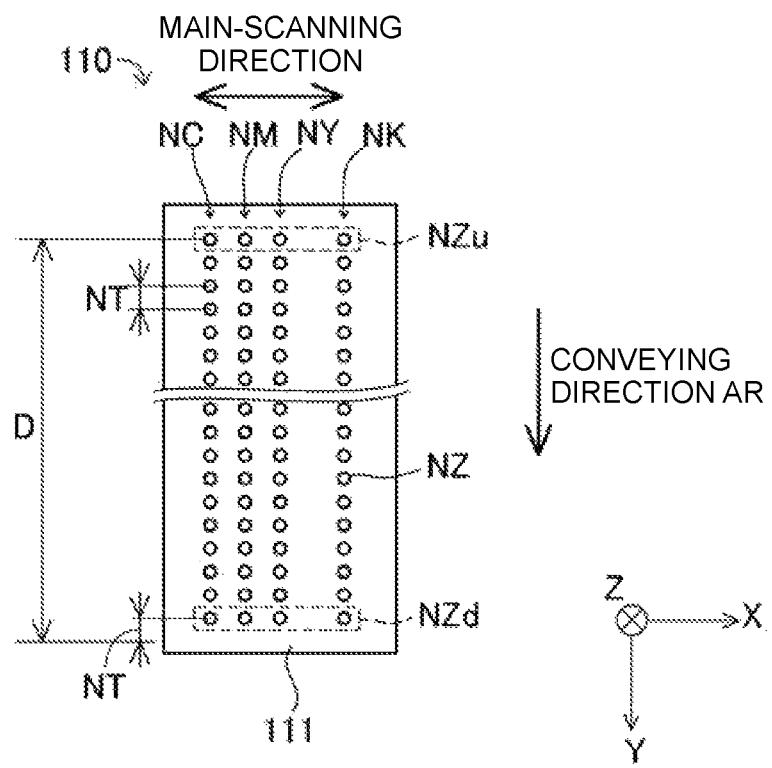

FIG. 2B depicts the configuration of the printing head 110 as being seen from a −Z side (lower side in FIG. 2A). As depicted in FIG. 2B, a plurality of nozzle rows or arrays formed of a plurality of nozzles, that is, a plurality of nozzle rows NC, NM, NY, NK from which the inks of C, M, Y, K are ejected or discharged, respectively, are formed in the nozzle formation surface 111 of the printing head 110. Each of the plurality of nozzle rows include a plurality of nozzle NZ which are aligned (arranged side by side) in the conveying direction AR. The plurality of nozzles NZ have positions which are mutually different in the conveyance direction AR (+Y direction); and the plurality of nozzles NZ are arranged side by side in the conveying direction AR at a predefined nozzle interval NT therebetween. The nozzle interval NT is a length in the conveying direction AR between two nozzles NZ which are included in the plurality of nozzles NZ and which are adjacent to each other in the conveying direction AR. Among the plurality of nozzles NZ forming each of the plurality of nozzle rows, a nozzle NZ which is positioned at an upstream-most side (−Y side) is also referred to as an upstream-most nozzle NZu. Among the plurality of nozzles NZ forming each of the plurality of nozzle rows, a nozzle NZ which is positioned at the downstream-most side (+Y side) is also referred to as a downstream-most nozzle NZd. A length obtained by adding the nozzle interval NT to a length in the conveying direction AR from the upstream-most nozzle NZu to the downstream-most nozzle NZd is also referred to as a nozzle length D. The nozzle length D is represented by a number (quantity) of nozzles included in each of the nozzle rows, with the number (quantity) of the nozzles as the unit. Note that in an actual product, although there is such a case that nozzles in the vicinity of both ends in the conveying direction AR are not used for the printing, an explanation will be given, in the present embodiment, regarding a case of performing printing by using all the nozzles corresponding to the nozzle length D, as an example. In the present embodiment, nozzle(s) usable for the printing are referred to as "usable nozzle(s)".

The positions in the main-scanning direction (X direction in FIG. 2B) of the nozzle rows NC, NM, NY, NK are different from one another; the positions in the conveying direction AR (Y direction in FIG. 2B) of the nozzle rows NC, NM, NY, NK overlap with one another. In an example depicted in FIG. 2B, for example, the nozzle row NM is arranged in the +X direction with respect to the nozzle row NY from which Y ink is discharged.

Figure 3A:
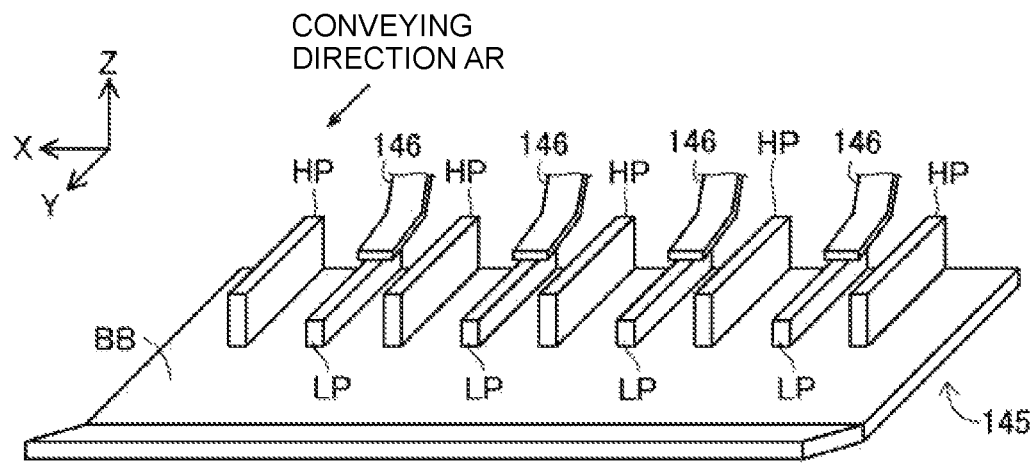
FIGS. 3A and 3B are each a perspective view of a sheet table and a plurality of pressing members.
Figure 3B:
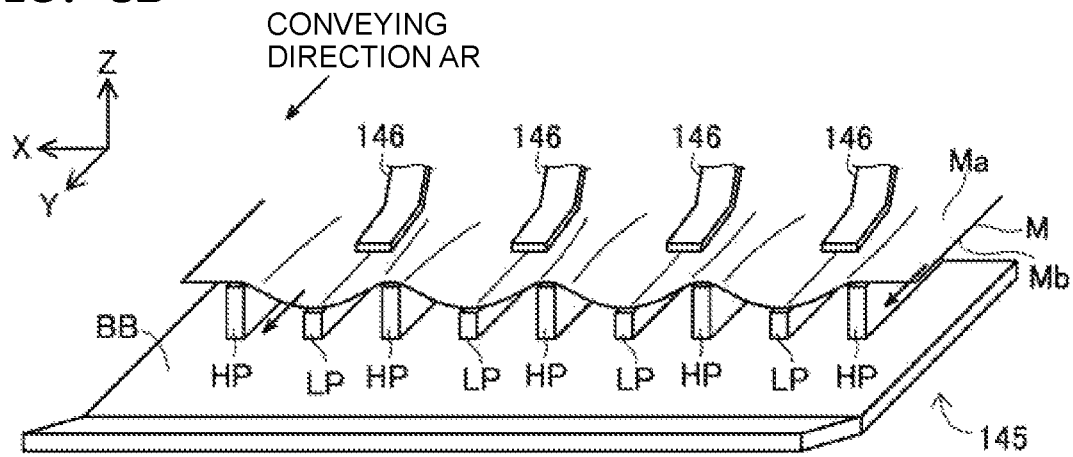

The conveyor 140 will be further explained, with reference to FIGS. 3A and 3B. FIGS. 3A and 3B are each a perspective view of the sheet table 145 and the plurality of pressing members 146. FIG. 3A depicts a state that the sheet M is not held, and FIG. 3B depicts a state that the sheet M is held. The sheet table 145 is provided with a plurality of high supporting members HP, a plurality of low supporting members LP and a flat plate BB.

The flat plate BB is a plate member which is substantially parallel to the main-scanning direction (X direction) and the conveying direction (+Y direction). An end on the upstream side (−Y side) of the flat plate BB is positioned in the vicinity of the upstream roller pair 142. An end on the downstream side (+Y side) of the flat plate BB is positioned in the vicinity of the downstream roller pair 141.

As depicted in FIG. 3A, the plurality of high supporting members HP and the plurality of low supporting members LP are arranged alternately along the X direction on the flat plate BB. Namely, each of the plurality of low supporting members LP is arranged between two high supporting members HP, among the plurality of high supporting members HP, which are adjacent to each of the plurality of low supporting members LP. Each of the high and low supporting members HP and LP is a rib extending along the Y direction. As depicted in FIG. 3A, an end on the upstream side (−Y side) of each of the plurality of high supporting members HP is positioned in an end on the upstream side of the flat plate BB. An end on the downstream side (+Y side) of each of the plurality of high supporting members HP is positioned in a central part in the Y direction of the flat plate BB. The positions of both ends in the Y direction of each of the plurality of low supporting members LP are same as the positions of both ends in the Y direction of each of the plurality of high supporting members HP.

The plurality of pressing members 146 are arranged in positions on the +Z side of the plurality of low supporting members LP. Positions in the X direction of the plurality of pressing members 146 are same as the positions in the X direction of the plurality of low supporting members LP. Namely, the position in the X direction of each of the plurality of pressing members 146 is between two high supporting members HP, among the plurality of high supporting members HP, which are adjacent to each of the plurality of pressing members 146. Each of the plurality of pressing members 146 is a plate member which is inclined closer to one of the plurality of low supporting members LP further toward the +Y direction. The positions in the Y direction of the plurality of pressing members 146 are on the upstream side (−Y side) with respect to the printing head 110, and on the downstream side (+Y side) with respect to the upstream roller pair 142.

As depicted in FIG. 3B, at a time of conveying the sheet M, the plurality of high supporting members HP and the plurality of low supporting members LP face a side of a surface Mb which is on the opposite side to a print surface Ma, and support the sheet M from the side of the surface Mb. The plurality of pressing members 146 face the print surface Ma, and press the sheet M from the side of the print surface Ma. In such a manner, the plurality of high supporting members HP, the plurality of low supporting members LP and the plurality of pressing members 146 hold the sheet M in a state that the sheet M is deformed in a wave-like shape along the X direction (see FIG. 3B). Further, the sheet M is conveyed in the conveying direction (+Y direction) in the state of being deformed in the wave-like shape, at a position facing the nozzle formation surface 111 of the printing head 110. In a case that the sheet M is deformed to have the wave-like shape, it is possible to increase the rigidity of the sheet M against any deformation along the Y direction. As a result, it is possible to suppress occurrence of such a situation that the sheet M is deformed to curl along the Y direction and the sheet M is lifted from the sheet table 145 toward the side of the printing head 110, or that the sheet M hangs down toward the side of the sheet table 145. In a case that the sheet M is lifted, or that the sheet M hangs down, a position at which the dot(s) is (are) formed is deviated or shifted, which in turn might lead to any lowering in the image quality of a print image, for example, any lowering in the image quality of the print image due to, for example, a banding. Further, in a case that the sheet M is lifted, the sheet M might make contact with the printing head 110, and the sheet M might be dirtied.

Note that in a state that the end on the upstream side (an end on the −Y side) of the sheet M which is being conveyed is located on the upstream side (the −Y side) with respect to a position Ys in FIG. 2A, the sheet M is pressed by the pressing members 146. In a state that the end on the upstream side of the sheet M which is being conveyed is located on the downstream side (the +Y side) with respect to the position Ys in FIG. 2A, the sheet M is not pressed by the pressing members 146. In the state that the sheet M is pressed by the pressing members 146, the sheet M is held further stably than the state that the sheet M is not pressed by the pressing member 146, and thus a distance between the sheet M and the nozzle formation surface 111 becomes also stable. Accordingly, in order to stabilize a position at which the dot(s) is (are) formed to thereby make the image quality to be stable, it is preferred, as much as possible, to perform the printing in the state that the sheet M is pressed by the pressing members 146.

<A-2: Printing Processing>

Figure 4:
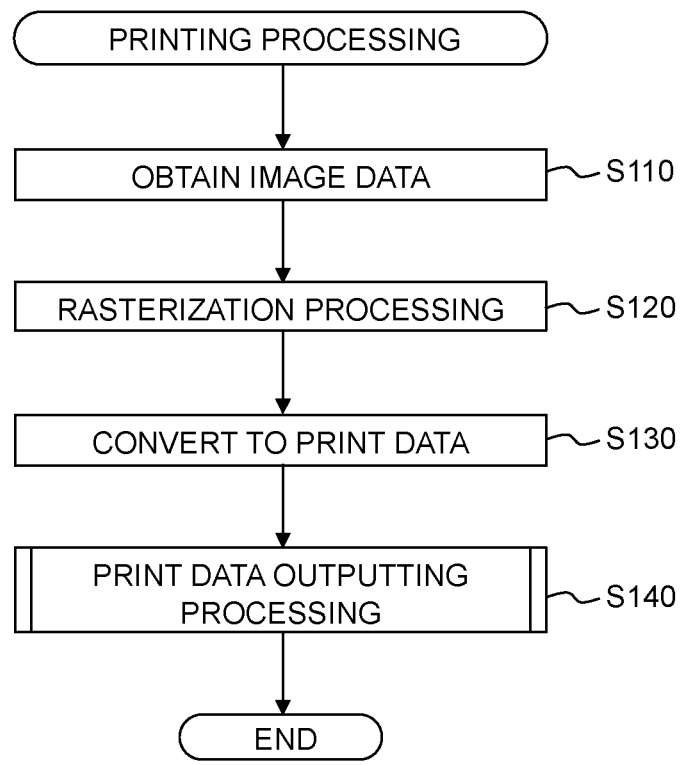
FIG. 4 is a flowchart of a print processing.

The CPU 210 (FIG. 1) of the printer 200 executes a printing processing based on a printing instruction which is inputted by a user via the operating part 260. The printing instruction includes designation of image data which indicates an image to be printed. FIG. 4 is a flow chart of the printing processing. In the processing of step S110, the CPU 210 obtains image data designated by the printing instruction from the volatile memory 220. Instead of this, it is allowable that the printing instruction and the image data are obtained from the terminal apparatus 300. The image data to be obtained is image data having various formats such as JPEG-compressed image data, image data described in a page-description language, etc.

In the processing of step S120, the CPU 210 executes a rasterization processing with respect to the obtained image data to thereby generate RGB image data. The RGB image data is thus obtained as object image data of the present embodiment. The RGB image data is bitmap data in which a RGB value is included for each of pixels. The RGB value is, for example, a color value of a RGB color system which includes three component values that are red (R), green (G), and blue (B).

In the processing of step S130, the CPU 210 converts the RGB image data to print data. Specifically, the CPU 210 executes a color conversion processing and a half tone processing with respect to the RGB image data. The color conversion processing is a processing of converting the RGB values of a plurality of pixels included in the RGB image data to CMYK values, respectively. The CMYK values are color values of the CMYK color system including component values corresponding to the ink(s) which is (are) to be used in the printing (in the present embodiment, the component values of C, M, Y and K). The color conversion processing is executed, for example, by referring to a publicly known look-up table defining the corresponding relationship between the RGB values and the CYMK values. The halftone processing is a processing of converting the image data for which the color conversion processing has been executed to print data (also referred to as "dot data"). The print data is data indicating a dot formation state for each of the pixels, with respect to each of the respective color components of CMYK. The value of each of the pixels in the dot data indicates, for example, a dot formation state of two gradations which are "no dot" and "with dot", or a dot formation state of four gradations which are "no dot", "small dot", "medium dot", and "large dot". The halftone processing is executed by using a publicly known method such as the dithering method, the error diffusion method, etc.

The CPU 210 executes, in the processing of step S140, a print data outputting processing. The print data outputting processing is a processing in which partial print data is generated per one time of a partial printing (to be described later on), a variety of control data is added to the partial print data, and then the partial print data is outputted to the printing mechanism 100. The control data includes data designating a conveying amount TL of sheet conveyance to be executed before the partial printing. In the print data outputting processing, the partial print data is output corresponding to a number of time(s) by which the partial printing is to be executed. The details of the print data outputting processing will be explained later on.

With this, the CPU 210 is capable of causing the printing mechanism 100 to perform printing of a print image PI. Specifically, the CPU 210 controls the head driving part 120, the main-scanning part 130, and the conveyor 140 to alternately execute the partial printing and the sheet conveyance repeatedly a plurality of times to thereby perform the printing. In one time of the partial printing (one partial printing), in a state that the sheet M is stopped on the sheet table 145, an ink(s) is (are) discharged or ejected from the nozzles NZ of the printing head 100 to the sheet M while performing one time of the main scanning (one main scanning), thereby printing a part of the image to be printed on the sheet M. One time of the sheet conveyance is a conveyance in which the sheet M is conveyed in the conveyance direction AR by an amount corresponding to the conveying amount TL which is determined in the print data outputting processing.

Figure 5:
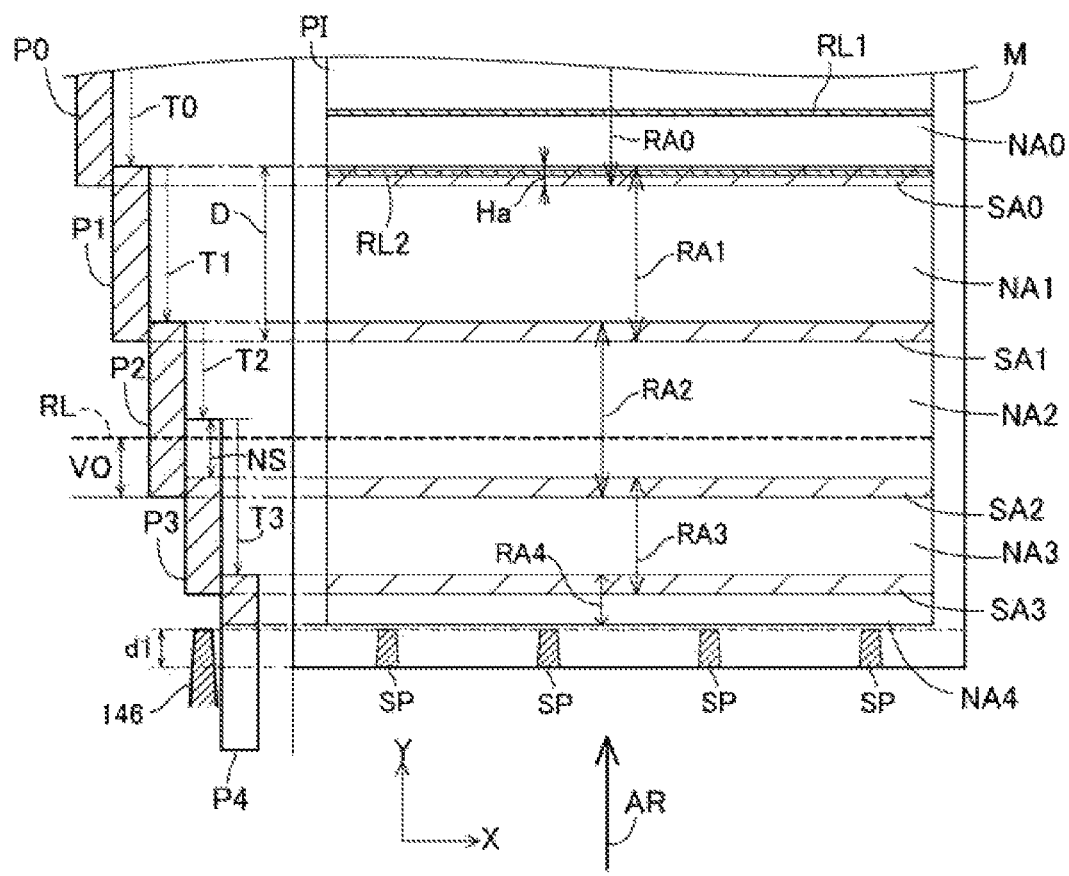
FIG. 5 is a first explanatory view of printing.

FIG. 5 is a first explanatory view of the printing of a first embodiment. FIG. 5 depicts an example of a print image PI (to be) printed on the sheet M. The print image PI includes a plurality of raster lines (e.g., RL1 in FIG. 5) which extend in the X direction in FIG. 5 (the main-scanning direction at the time of printing) and of which positions in the Y direction (the conveying direction AR at the time of printing) are mutually different. Each of the raster lines is a line in which a plurality of dots may be formed.

Further, FIG. 5 depicts head positions P0 to P4, namely, relative positions in the conveying direction AR of the printing head 110 with respect to the sheet M. The head positions P0 to P4 is head positions of five times of the partial printing (five partial printings) which are executed last among a plurality of times of partial printing (a plurality of partial printings). In FIG. 5, four times of sheet conveyance (four sheet conveyances) T0 to T3 are depicted by arrows, respectively. For example, the sheet conveyance T0 is a sheet conveyance to be performed after the partial printing executed at the head position P0. Each of the sheet conveyances T1, T2 and T3 is sheet conveyance to be performed after the partial printing executed at one of the head positions P1, P2 and P3.

In each of the head positions P0 to P4, a hatched range is a range in which a nozzle(s) NZ (also referred to as "used nozzle(s)") to be used for printing in a partial printing to be executed at each of the head positions P0 to P4 is/are positioned in each of the head positions P0 to P4. The used nozzle(s) is/are a part or entirety of the usable nozzles (in the present embodiment, all the nozzles corresponding to the nozzle length D). In the example depicted in FIG. 5, in a partial printing executed in each of the head positions P0 to P2, all the usable nozzles are used. In a partial printing executed in the head position P3, a part, of the nozzles NZ, on the downstream side is not used. In a partial printing executed in the head position P4, a part, of the nozzles NZ, on the upstream side is not used.

In FIG. 5, the print image PI which is (to be) formed on the sheet M includes a plurality of normal areas (for example, areas NA0 to NA4 which are not hatched in FIG. 5), and a plurality of end areas (for example, hatched areas SA0 to SA3 in FIG. 5). For example, an area RA0 which is (to be) printed by the partial printing executed at the head position P0 includes the normal area NA0 and the end area SA0 on the upstream side (−Y side) with respect to the normal area NA0. An area RA1 which is (to be) printed by the partial printing executed at the head position P1 includes the normal area NA1, the end area SA0 located on the downstream side (+Y side) with respect to the normal area NA1, and the end area SA1 on the upstream side (−Y side) with respect to the normal area NA1. An area RA2 which is (to be) printed by the partial printing executed at the head position P2 includes the normal area NA2, the end area SA1 located on the downstream side (+Y side) with respect to the normal area NA2, and the end area SA2 on the upstream side (−Y side) with respect to the normal area NA2. An area RA3 which is (to be) printed by the partial printing executed at the head position P3 includes the normal area NA3, the end area SA2 located on the downstream side (+Y side) with respect to the normal area NA3, and the end area SA3 on the upstream side (−Y side) with respect to the normal area NA3. An area RA4 which is (to be) printed by the partial printing executed at the head position P4 includes the normal area NA4, and the end area SA3 located on the downstream side (+Y side) with respect to the normal area NA4.

Each of the normal areas is an area in which each of the respective raster lines within the area is printed only by one time of partial printing (partial printing performed once). For example, in each of the raster lines in a normal area NAk ("k" being an integer in a range of 0 to 4) in FIG. 5, the dots are formed only by the partial printing performed in a head position Pk. Namely, in each of the raster lines in the normal area NAk, dots of a specified color, for example, dots of C, are formed by using one piece of the nozzle NZ (one nozzle NZ) included in the nozzle row NC and corresponding to each of the raster lines.

Each of the end areas is an area in which each of the respective raster lines within the area is printed by two times of partial printing (partial printing performed twice). For example, in each of the raster lines in an end area SAI ("I" being an integer in a range of 0 to 3) in FIG. 5, the dots are formed by both of a partial printing performed at a head position PI and a partial printing performed at a head position P(I+1). Namely, in each of the raster lines in the end area SAI, dots of a specified color, for example, dots of C, are formed by using two pieces of the nozzle NZ (two nozzles NZ) included in the nozzle row NC and corresponding to each of the raster lines. For example, the two nozzles NZ corresponding to the raster line in the end area SAI are a nozzle NZ corresponding to said raster line in the partial printing performed at the head position PI and a nozzle NZ corresponding to said raster line in the partial printing performed at the head position P(I+1).

A length Ha (see FIG. 5) in the conveying direction AR of the end area is, with the raster line being as an unit, for example, three to several tens, and is 6 (six) in the present embodiment. In the present embodiment, since the nozzles NZ and the raster lines are corresponding to one another, making the raster line as the unit is same as making the number (quantity) of the nozzle(s) as the unit.

The reason for providing the end areas is explained below. It is assumed that a print image is formed only by images printed in the normal areas, without providing the end areas. In this case, an inconvenience which is referred to as a so-called banding such as a white streak and/or a black streak appearing at a boundary between two normal areas adjacent to each other in the conveying direction AR might be caused, due to any variation in the conveying amount of the sheet M, etc. The banding lowers the image quality of the print image PI. By providing the end area between two pieces of the normal area and by printing the image on the end area, it is possible to suppress the occurrence of the inconvenience referred to as the banding as described above. Since the dots on one raster line in the end area are formed by the partial printing performed twice, it is possible to suppress such a situation that all the dots on a certain one raster line are deviated uniformly with respect to all the dots on another raster line different from the certain raster line.

In the present embodiment, a partial printing(s) which is (are) included in the plurality of partial printings and which is (are) different from the last partial printing is (are) performed in the state that the sheet M is pressed by the plurality of pressing members 146, namely, in the state that the print surface of the sheet M faces the pressing members 146. The last partial printing is performed in the state that the sheet M is not pressed by the plurality of pressing members 146. In the present embodiment, in order that the printing is performed, as much as possible, in a state that the sheet M is pressed by the plurality of pressing members 146, a print processing which is immediately before the last partial printing (which is first from the last partial printing, penultimate partial printing) is performed in a state that a specified position SP in the vicinity of the upstream end of the sheet M is pressed by the pressing members 146. As depicted in FIG. 5, the penultimate partial printing is the partial printing (to be) executed at the head position P3. In FIG. 5, each of the pressing members 146 indicated on the upstream side of the head position P3 is illustrated at a position in the conveying direction AR of pressing the specified position SP. With this, an image to be printed by the last partial printing, namely, by the partial printing performed at the head position P4 of FIG. 5 can be made small. Accordingly, the last partial printing can be executed by using only nozzles NZ which are included in the plurality of nozzles NZ and which are located on the downstream side, as a part of the plurality of nozzles NZ. As a result, although the last partial printing is performed in a state that the sheet M is held only by the downstream roller pair 141, it is possible to make the length from the downstream roller pair 141 to the upstream end of the sheet M can be short at a time of performing the last partial printing. Accordingly, it is possible to suppress such an inconvenience that the upstream end of the sheet M makes contact with the nozzle formation surface 111 of the printing head 110, and to stabilize a position at which the dots are formed (dot formation position). In the following, the head position P3 at which a state that the pressing members 146 press the specified position SP of the sheet M is provided is referred also to an "end-pressing head position".

<A-3: Print data Outputting Processing>

Figure 6A:
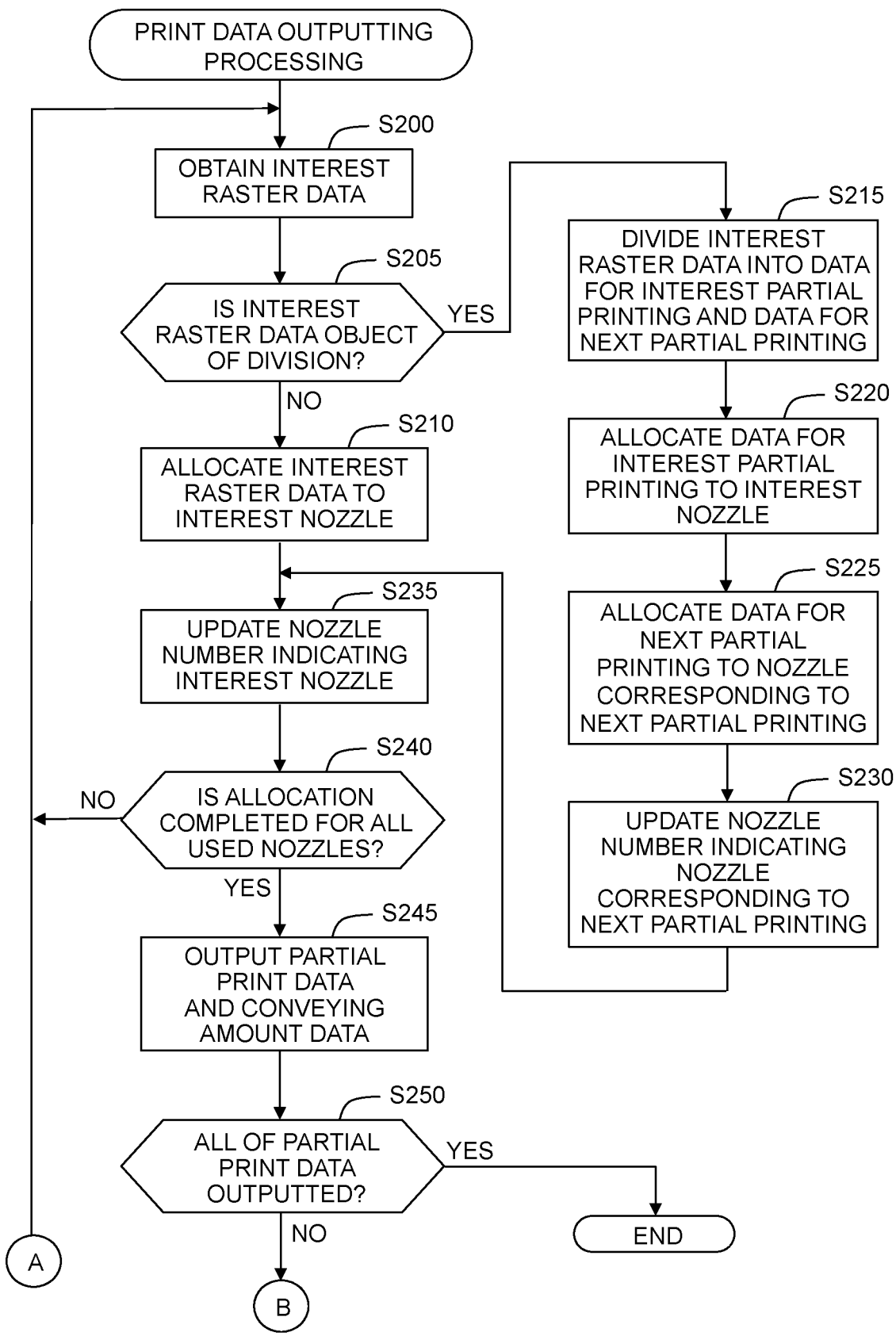
FIGS. 6A and 6B is a flowchart of a print data outputting processing.
Figure 6B:
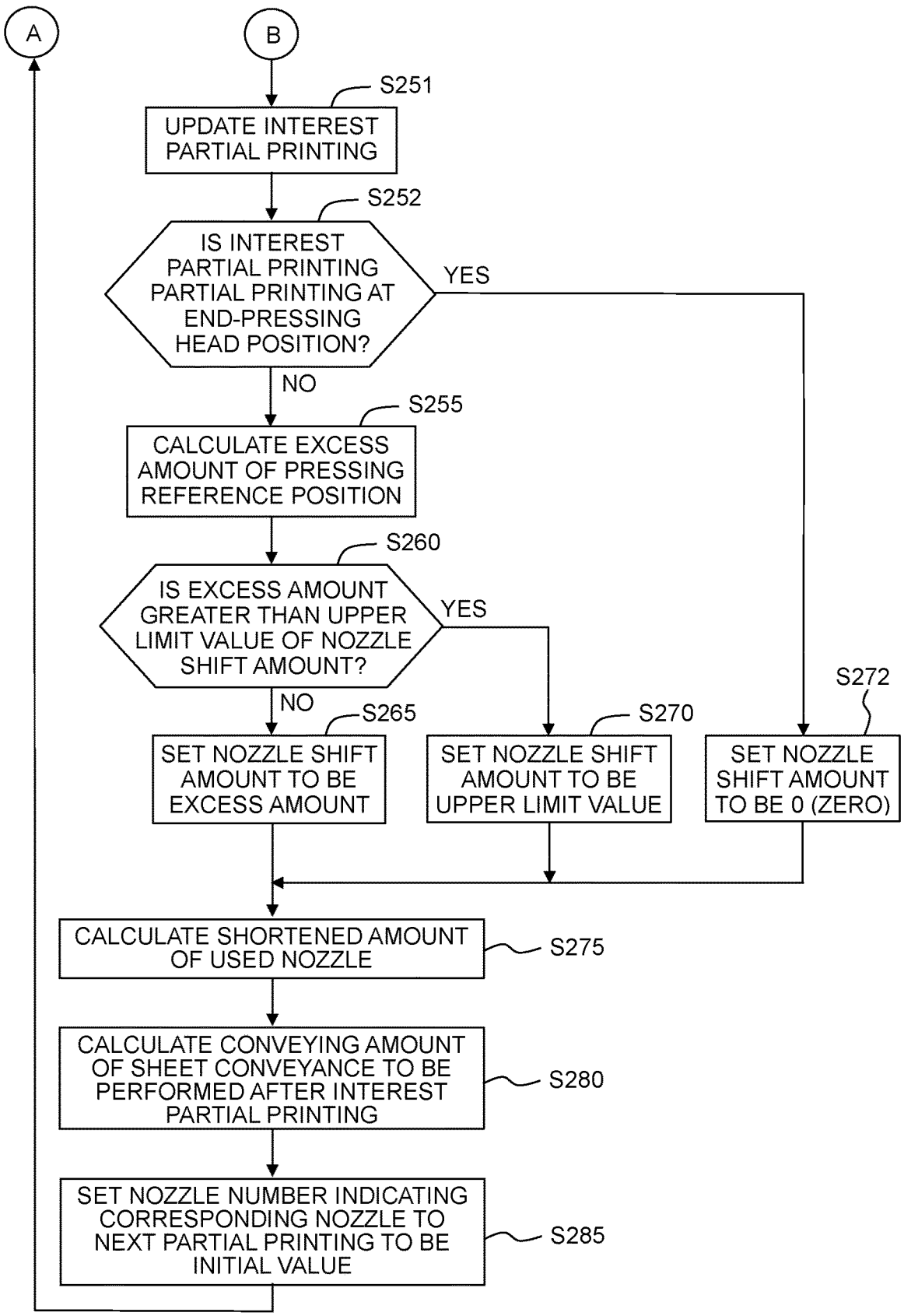

Next, the print data outputting processing in the processing of step S140 of FIG. 4A will be explained. As described above, the print data outputting processing is a processing of generating the partial print data per each of (one time of) the partial printing by using the print data generated in the processing of step S130, of adding the variety of kinds of control data to the partial print data, and then of outputting the partial print data to the printing mechanism 100. FIGS. 6A and 6B depict a flow chart of the print data outputting processing.

The print data generated in the processing of step S130 of FIG. 4 indicates the print image PI (FIG. 5) which is to be printed. Accordingly, the print data includes a plurality of pieces of raster data each of which corresponds to one of a plurality of raster lines included in the print image PI.

In the processing of step S200, the CPU 210 obtains raster data (hereinafter referred also to as "interest raster data"), among the plurality of pieces of raster data, which corresponds to one interest raster line. The interest raster line is included in the print image PI, and is selected sequentially one by one, from the downstream side in the conveyance direction AR at the time of printing (+Y side in FIG. 5), among the plurality of raster lines arranged side by side in the conveying direction AR.

Here, a partial printing by which the interest raster line is printed is also referred to as an interest partial printing. Note that, however, in a case that the interest raster line is to be printed by two times of the partial printing, namely, in a case that the interest raster line is positioned within an end area, a partial printing included in the two times of the partial printing and which is executed first is defined as the interest partial printing. For example, in a case that the raster lines RL1 and RL2 in FIG. 5 are each the interest raster line, the interest partial printing is a partial printing which is performed at the head position P0 (FIG. 5). A nozzle NZ which is used for forming dots on the interest raster line in the interest partial printing is referred also to as an "interest nozzle". For example, in a case that a raster line which is to be processed first, namely, a raster line positioned on the downstream-most side in the print image PI is the interest raster line, the interest nozzle is a nozzle NZ which is positioned on the downstream-most side among the usable nozzles.

In the processing of step S205, the CPU 210 judges as to whether or not the interest raster data is an object of division. In a case that the interest raster line is positioned within an end area, in other words, in a case that the interest nozzle is a predetermined piece (in the present embodiment, 6 pieces) of nozzle NZ which are included in the usable nozzles and which are positioned at an end on the upstream side, the interest raster data is judged to be the object of division. In a case that the interest raster line is positioned within a normal area, the interest raster data is judged not to be the object of division.

In a case that the interest raster data is not the object of division (step S205: NO), namely, in a case that the interest raster line is positioned within the normal area, the CPU 210 allocates, in the processing of step S210, the interest raster data to the interest nozzle. The interest nozzle at the time of starting the print data outputting processing is a nozzle NZ located at the downstream end among the usable nozzles.

In a case that the interest raster data is the object of division (step S205: YES), namely, in a case that the interest raster line is positioned within the end area, the CPU 210 divides, in the processing of step S215, the interest raster data into data for the interest partial printing and data for a partial printing which is to be performed next to the interest partial printing (next partial printing).

Figure 7A:
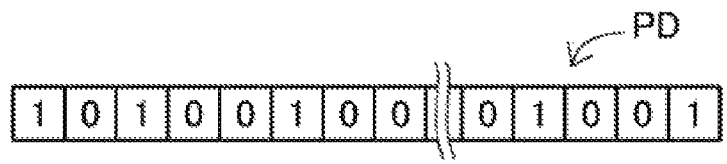
FIG. 7A is a view explaining division pattern data and FIG. 7B is a view explaining recording ratios of partial printings.
Figure 7B:
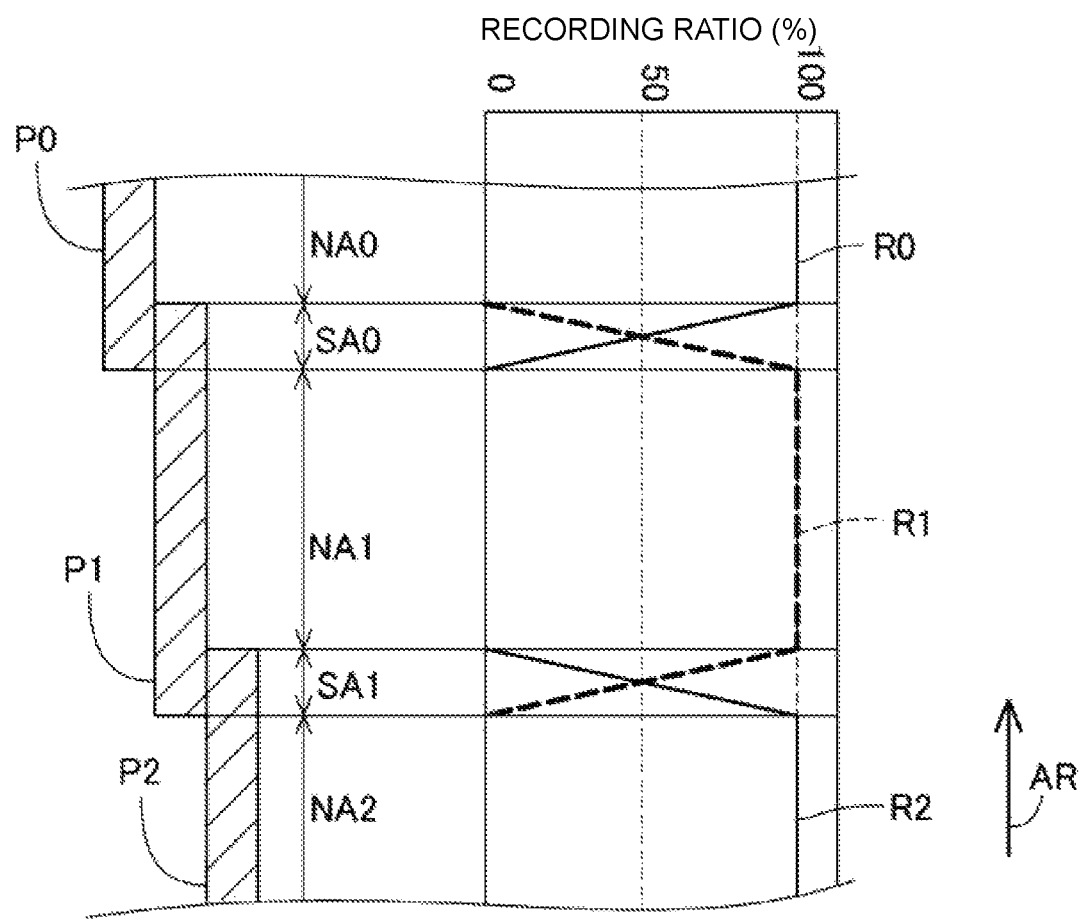

Specifically, the CPU 210 obtains division pattern data PD corresponding to the interest raster line. FIG. 7A is a view depicting the division pattern data PD, and FIG. 7B is a view depicting recording ratios of the partial printings executed in the head positions P0 to P2, respectively. As depicted in FIG. 7A, the division pattern data PD is binary data having values corresponding to the pixels, respectively, of the interest raster line. A value "0 (zero)" of the division pattern data PD indicates that a dot corresponding to a certain pixel is to be formed in the interest partial printing. A value "1 (one)" of the division pattern data PD indicates that the dot corresponding to the certain pixel is to be formed in a partial printing which is to be executed next to the interest partial printing.

Here, the recording ratios R0, R1 and R2 in FIG. 7B are recording ratios of the partial printings executed at the head positions P0, P2 and P2, respectively. FIG. 7B indicates the respective recording ratios R0, R1 and R2 with respect to positions in the conveyance direction AR, respectively. In a range in the conveyance direction AR corresponding to the normal area NA0, the recording ratio R0 is 100%. Similarly, in ranges in the conveyance direction AR corresponding to the normal areas NA1 and NA2, respectively, the recording ratios R1 and R2 are each 100%.

In a range in the conveyance direction AR corresponding to the end area SA0, the recording ratio R0 is linearly reduced toward the upstream side (the lower side in FIG. 7B) of the conveyance direction AR. In the range in the conveyance direction AR corresponding to the end area SA0, the recording ratio R1 is linearly reduced toward the downstream side (the upper side in FIG. 7B) of the conveyance direction AR. In the range in the conveyance direction AR corresponding to the end area SA0 (FIG. 5), a sum of the recording ratio R0 and the recording ratio R1 is 100%. This is similarly applicable also to the recording ratios R1 and R2 in a range in the conveyance direction AR corresponding to the end area SA1.

The division pattern data PD is generated so that the above-described recording ratios are realized depending on the position in the conveyance direction AR of the interest raster line in the end area. The CPU 210 divides, according to the division pattern data PD, the interest raster data into the data for the interest partial printing and the data for the next partial printing.

In the processing of step S220, the CPU 210 allocates the data for the interest partial printing to the interest nozzle. In the processing of step S225, the CPU 210 allocates the data for the next partial printing to a nozzle corresponding to the next partial printing (corresponding nozzle). Here, the corresponding nozzle is a nozzle NZ to be used for forming the dots on the interest raster line in the next partial printing. The corresponding nozzle at a time of starting the print data outputting processing is a nozzle NZ on the downstream end of the usable nozzles. For example, in a case that the raster line RL2 in FIG. 5 is the interest raster line, the corresponding nozzle is a nozzle NZ located at an end on the downstream side (+Y side in FIG. 5) among the usable nozzles in the head position P1.

In the processing of step S230, the CPU 210 updates a number indicating the corresponding nozzle of the next partial printing. Namely, the CPU 210 changes the number indicating the corresponding nozzle to a number indicating a nozzle NZ which is on the upstream side, only by one, with respect to the current corresponding nozzle.

In the processing of step S235, the CPU 210 updates a number indicating the interest nozzle. Namely, the CPU 210 changes the number indicating the interest nozzle to a number indicating a nozzle NZ which in on the upstream side, only by one, with respect to the current interest nozzle.

In the processing of step S240, the CPU 210 judges as to whether or not the raster data is allocated to all the used nozzles in the interest partial printing. Specifically, in a case that the number indicating the interest nozzle after the update exceeds the number indicating a nozzle which is on the upstream-most side among the used nozzles, the CPU 210 judges that the raster data has been allocated to all the used nozzles. In a case that there is a used nozzle to which the raster data has not been allocated (step S240: NO), the CPU 210 returns to the processing of step S200.

In a case that the raster data has been allocated to all of the used nozzles (step S240: YES), the CPU 240 outputs, in the processing of step S245, partial print data for the interest partial printing, and conveying amount data to the printing mechanism 100. The partial print data is a raster data group allocated to the used nozzles. The conveying amount data is control data indicating the conveying amount TL. In a case that the interest partial printing is a foremost partial printing, which is the partial printing performed first or foremost, the conveying amount TL is determined such that a position, on the sheet M, at which the downstream end of the print image PI is to be printed, and a position of a nozzle NZ which is located on the downstream end among the used nozzles are coincident with each other. In a case that the interest partial printing is a second partial printing, the conveying amount TL is a value obtained by deducting a number (quantity) of nozzle(s) corresponding to the end area from the number (quantity) of the usable nozzles. In the present embodiment, since the number (quantity) of the usable nozzles is the nozzle length D and the number of the nozzle(s) corresponding to the end area is the length Ha in the conveying direction AR of the end area, the conveying amount TL determined in a case that the interest partial printing is the second partial printing is TL=(D−Ha). This conveying amount is previously determined on a premise that the head position of the second partial printing will not become to be the end-pressing head position. In a case that the interest partial printing is the third partial printing and thereafter, the conveying amount TL is determined in the processing of step S280 which will be described later on. In a case that the printing mechanism 100 receives the partial print data and the conveying amount data, the printing mechanism 100 executes the sheet conveyance by an amount corresponding to the conveying amount TL indicated by the conveying amount data, and then executes the partial printing by using the partial print data.

In the processing of step S250, the CPU 210 judges as to whether or not all of the partial print data has been outputted. In a case that all of the partial print data has been outputted (step S250: YES), the CPU 210 ends the print data outputting processing. In a case that all of the partial print data has not been outputted (step S250: NO), the CPU 210 updates the interest partial printing in the processing of step S251.

Namely, the CPU 210 makes the interest partial printing to be a next partial printing next to the current interest partial printing. Specifically, the number indicating the corresponding nozzle of the next interest partial printing at the current point of time is set newly to be the number indicating the interest nozzle. The number indicating the corresponding nozzle of the next interest partial printing at the current point of time is made to be a number indicating a nozzle on the downstream end in the normal area. For this reason, the number indicating a new interest nozzle is set to be the number indicating a nozzle on the downstream end in the normal area.

In the processing of step S252, the CPU 210 judges as to whether or not the interest partial printing is a partial printing which is to be executed at the end-pressing head position. In the example of FIG. 5, in a case that the interest partial printing is the partial printing which is to be executed at the head position P3, the interest partial printing is judged to be the partial printing which is to be executed at the end-pressing head position. In a case that the interest partial printing is not the partial printing which is to be executed at the end-pressing head position (step S252: NO), the CPU 210 proceeds to the processing of step S255.

In the processing of step S255, the CPU 210 calculates an excess amount VO of a pressing reference position RL at the interest partial printing. The excess amount VO indicates a length from the pressing reference position RL to an upstream-most nozzle NZ which is a nozzle NZ on the upstream-most side among the usable nozzle at the head position in the interest partial printing, in a case that the upstream-most nozzle NZ is positioned on the upstream side with respect to the pressing reference position RL. The pressing reference position RL (FIG. 5) is a position in the conveying direction AR determined on the sheet M. In a case that the upstream-most nozzle NZ in the interest partial printing is positioned on the upstream side with respect to the pressing reference position RL, the partial printing next to the interest partial printing is executed at the end-pressing head position (the head position P3 of FIG. 5). In the example of FIG. 5, in a case that the partial printing to be executed at the head position P2 is the interest partial printing, a nozzle NZ on the upstream-most at the head position P2 is positioned on the upstream side with respect to the pressing reference position RL. Thus, the excess amount VO indicated in FIG. 5 is calculated. The unit of the excess amount VO is indicated, for example, by the number (quantity) of the nozzle(s) (the number (quantity) of the raster line(s)).

In a case that the upstream-most nozzle is same as the pressing reference position RL, or that the upstream-most nozzle is positioned at the downstream side with respect to the pressing reference position RL, the excess amount VO is 0 (zero). In the example of FIG. 5, in a case that the partial printing executed at the head position P0 or the head position P1 is the interest partial printing, the upstream-most nozzle in the head position P0 or the head position P1 is positioned on the downstream side with respect to the pressing reference position RL, and thus the excess amount VO is 0 (zero).

In the processings of steps S260 to S270, the CPU 210 sets a nozzle shift amount NS of a partial printing to be performed next to the interest partial printing (next partial printing), based on the excess amount VO. The nozzle shift amount NS indicates a number (quantity) of nozzle(s) NZ which is included in the usable nozzles and which is not used on the downstream side (also referred to as a "downstream-side non-used nozzle") in the next partial printing to be performed next to the interest partial printing. In a case that the nozzle shift amount NS is 0 (zero), the downstream-side non-used nozzle is not provided or set. In a case that the nozzle shift amount NS is not less than 1 (one), a nozzle(s) NZ on the downstream side (+Y side in FIG. 5) of which number (quantity) corresponds to the nozzle shift amount NS is (are) the downstream-side non-used nozzle(s). Accordingly, in this case, a nozzle(s), which is (are) included in the usable nozzles and which is (are) different from the downstream-side non-used nozzle(s) is (are) a used nozzle(s) to be used in the next partial printing to be performed next to the interest partial printing.

In the processing of step S260, the CPU 210 judges as to whether or not the excess amount VO is greater than an upper limit value NSmax of the nozzle shift amount NS. The upper limit value NSmax is a value obtained by deducting two times the number (quantity) of nozzle(s) corresponding to the end area from the number of the usable nozzles. In the present embodiment, since the number (quantity) of the usable nozzles is the nozzle length D and the number (quantity) of the nozzle(s) corresponding to the end area is Ha, the upper limit value NSmax is (D−2×Ha). In other words, the upper limit value NSmax is determined so that the length in the conveying direction AR of an area printed by one time of the partial printing (for example, the area RA3) becomes to be at least not less than two times the length Ha in the conveying direction AR of the end area.

In a case that the nozzle shift amount NS is not more than the upper limit value NSmax (step S260: NO), the CPU 210 sets, in the processing of step S265, the nozzle shift amount NS to be the excess amount VO. In a case that the nozzle shift amount NS is greater than the upper limit value NSmax (step S260: YES), the CPU 210 sets, in the processing of step S270, the nozzle shift amount NS to be the upper limit value NSmax.

In a case that the interest partial printing is the partial printing to be executed at the end part-pressing head position (step S252: YES), the CPU 210 sets, in the processing of step S272, the nozzle shift amount NS to be 0 (zero). In the case that the interest partial printing is the partial printing which is to be executed at the end part-pressing head position, the next partial printing becomes to be the last partial printing. The reason for this is that, in the last partial printing, the non-used nozzle is not set for the downstream end of the usable nozzle.

In the processing of step S275, the CPU 210 calculates a shortened amount VS of the used nozzles in the interest partial printing. The shortened amount VS of the used nozzles indicates a number (quantity) of a nozzle(s) NZ, which is/are included in the usable nozzles and which is/are not used on the upstream side (also referred to as an "upstream-side non-used nozzle(s)"). In a case that the shortened amount VS is 0 (zero), the upstream-side non-used nozzle is not provided or set. In a case that the shortened amount VS is not less than 1 (one), a nozzle(s) NZ corresponding to the shortened amount VO on the upstream side (−Y side in FIG. 5) is the upstream-side non-used nozzle(s). Accordingly, in such a case, nozzles which are included in the usable nozzles and which are different from the upstream-side non-used nozzle(s) are the used nozzle in the interest partial printing.

The shortened amount VS is calculated based on the excess amount VO and the nozzle shift amount NS. In the present embodiment, the shortened amount VS is a value obtained by deducting the nozzle shift amount NS from the excess amount VO (VS=VO−NS). Here, in a case that the excess amount VO is not more than the upper limit value NSmax, the nozzle shift amount NS is set to be the excess amount VO in the processing of step S265 (NS=VO); and thus the shortened amount VS is set to be 0 (zero). In a case that the excess amount VO is greater than the upper limit value NSmax, the nozzle shift amount NS is set to be the upper limit value NSmax which is smaller than the excess amount VO in the processing of step S270, and thus the shortened amount VS is set to be a value greater than 0 (zero) (VO−NSmax). Note that the shortened amount VS is set to be a value smaller than a number (quantity) of nozzle Ha which corresponds to the end area (0≤VS<Ha).

In the processing of step S280, the CPU 210 determines, based on the nozzle shift amount NS and the shortened amount VS, the conveying amount TL of the sheet conveyance to be performed after the interest partial printing. The conveying amount TL is calculated with the number (quantity) of the nozzle(s) as the unit. The conveying amount TL is a value obtained by deducting, from the number (quantity) of the usable nozzles, the number (quantity) of the nozzle(s) corresponding to the end area, the nozzle shift amount NS and the shortened amount VS. In the present embodiment, since the number (quantity) of the usable nozzles is the nozzle length D and the number (quantity) of the nozzle(s) corresponding to the end area is the length Ha in the conveying direction AR of the end area, the conveying amount TL is TL=(D−Ha−Ns−VS).

Here, since the shortened amount VS is (VO−NS), the conveying amount TL can be represented also as (D−Ha−VO). Namely, the conveying amount TL becomes smaller as the excess amount VO is greater, and becomes greater as the excess amount VO is smaller. Accordingly, provided that a reference value TLth of the conveying amount TL is TLth=(D−Ha−NSmax), then a situation that the shortened amount VS is set to be 0 (zero) in a case that the excess amount VO is not more than the upper limit value NSmax, and that the shortened amount VS is set to be a value greater than 0 (zero) (VO−NSmax) in a case that the excess amount VO is greater than the upper limit value NSmax can also rephrased as the following. Namely, the shortened amount VS is set to be 0 (zero) in a case that the conveying amount TL is not less than the reference value TLth, and that the shortened amount VS is set to be a value greater than 0 (zero) (VO−NSmax) in a case that the conveying amount TL is smaller than the reference value TLth.

Further, since the conveying amount TL becomes smaller as the excess amount VO is greater, the shortened amount VS becomes greater as the conveying amount TL is smaller in a case that the conveying amount TL is smaller than the reference value TLth.

In the processing of step S285, the CPU 210 sets the number indicating the corresponding nozzle of the partial printing next to the interest partial printing to be an initial value. The initial value is a number indicating a nozzle which is included in the usable nozzles and which is positioned on the upstream side, by an amount corresponding to the nozzle shift amount NS, from the downstream end. After the processing of step S285, the CPU 210 returns to the processing of step S200.

The printing of the present embodiment, as explained above, will be further explained with reference to FIG. 5. In the partial printing which is executed before the partial printing executed at the head position P3, which is the end-pressing head position, for example, in the partial printing executed at each of the head positions P1 and P2, it is preferred to use all the usable nozzles so as to realize a high-speed printing. For this purpose, the nozzle shift amount NS of the partial printing to be executed at each of the head positions P1 and P2 is set to 0 (zero) (step S265 of FIG. 6B), and the conveying amount TL of each of the sheet conveyances T0 and T1 which are immediately before these partial printings, respectively, is set to be TL=(D−Ha) (step S280 of FIG. 6B). Further, it is preferred that the last partial printing executed at the head position P4 is executed in a state that the length from the downstream roller pair 141 to the upstream end of the sheet M is as short as possible. Thus, it is preferred that the last partial printing executed at the head position P4 is executed by using the nozzle on the downstream side of (in) the head position P4. For this purpose, the nozzle shift amount NS of the last partial printing is set to be 0 (zero) (step S272 of FIG. 6B), and the conveying amount TL of the sheet conveyance T3 immediately before the last partial printing is set to be TL=(D−Ha) (step S280 of FIG. 6B).

The head position P3 which is the end-pressing head position is a position in the conveying direction AR which is fixed with respect to the sheet M. Therefore, the nozzle shift amount NS of the partial printing to be executed at the head position P3 is set depending on the position in the conveying direction AR of the head position P2 (steps S260 to S270 of FIG. 6B), and the conveying amount TL of the sheet conveyance T2 immediately before the partial printing to be executed at the head position P3 is determined (step S280 of FIG. 6B). Accordingly, except for such a case that the head position P2 with respect to the sheet M is accidentally on the downstream side with respect to the end-pressing head position, by an amount corresponding to (D−Ha), the nozzle shift amount NS of the partial printing at the head position P3 is set to be a value greater than 0 (zero), and the conveying amount TL of the sheet conveyance T2 is determined to be a value smaller than (D−Ha).

In the example of FIG. 5, the position in the conveying direction AR of the head position P2 and the position in the conveying direction AR of the head position P3 which is the end-pressing head position are relatively apart from each other. Accordingly, the excess amount VO becomes to be not more than the upper limit value NSmax. Therefore, in the example of FIG. 5, the nozzle shift amount NS of the partial printing at the head position P3 is set to be the excess amount VO (steps S260, S265), and the shortened amount VS of the used nozzle in the partial printing at the head position P2 is determined to be 0 (zero) (step S280).

Here, the position in the conveying direction AR of the head position P2 varies due to, for example, a margin on the downstream side of the print image PI (the +Y side in FIG. 5), the length in the conveying direction AR of the sheet M, etc. Further, in a case that there is a blank part in an intermediate location or part in the conveying direction AR of the print image PI and that the printing is performed while skipping the blank part, the position in the conveying direction AR of the head position P2 varies, depending on the blank part included in the print image PI. Accordingly, there is such a case that the position in the conveying direction AR of the head position P2 and the position in the conveying direction AR of the head position P3 which is the end-pressing head position are close to each other. Regarding the printing in such a case, an explanation will be given while comparing the present embodiment with a reference embodiment.

Figure 8A:
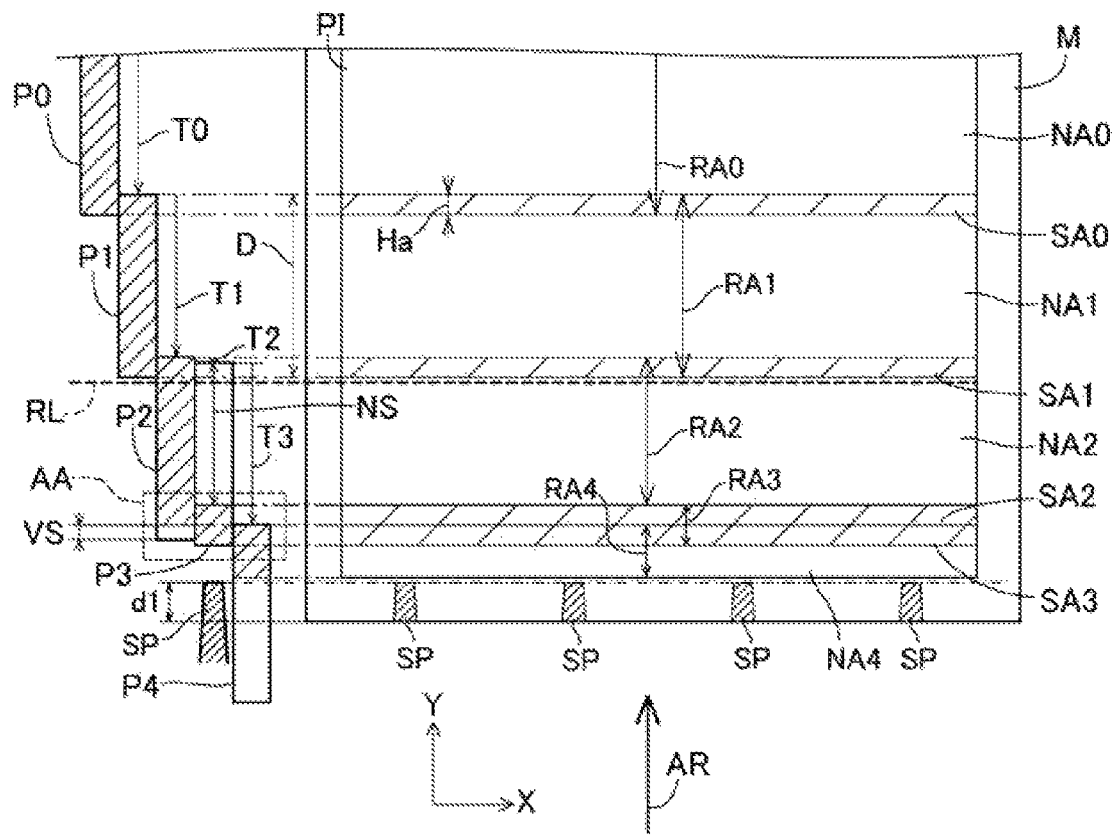
FIGS. 8A and 8B are each a second explanatory view of printing.
Figure 8B:
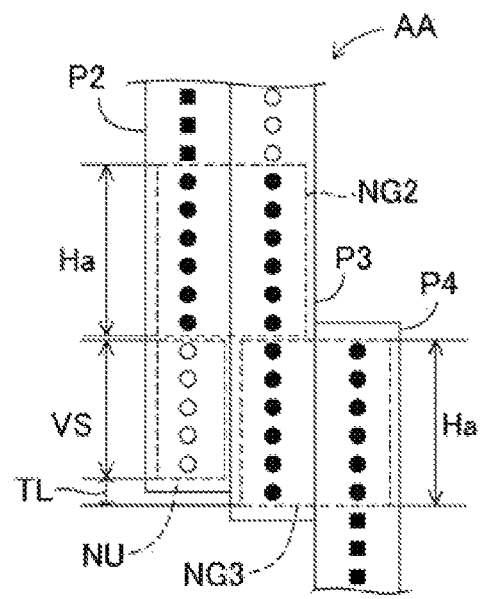
Figure 9A:
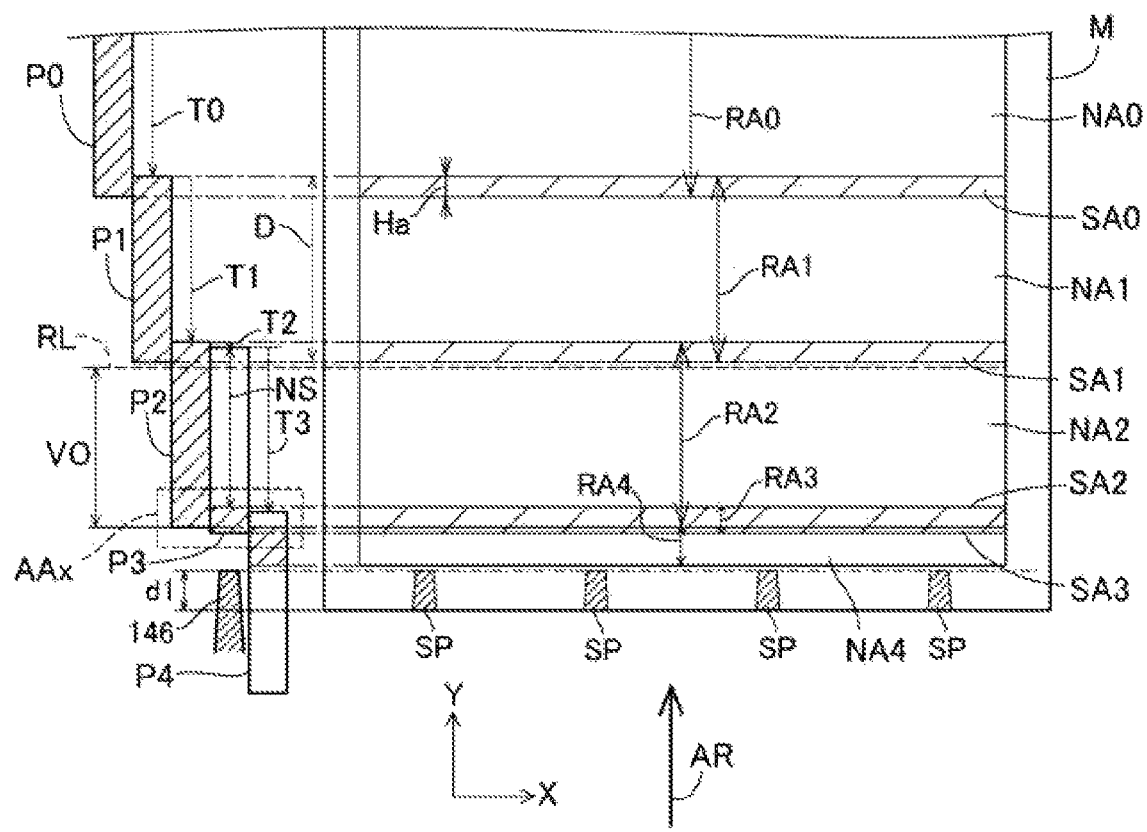
FIGS. 9A and 9B are each an explanatory view of printing according to a reference embodiment.
Figure 9B:
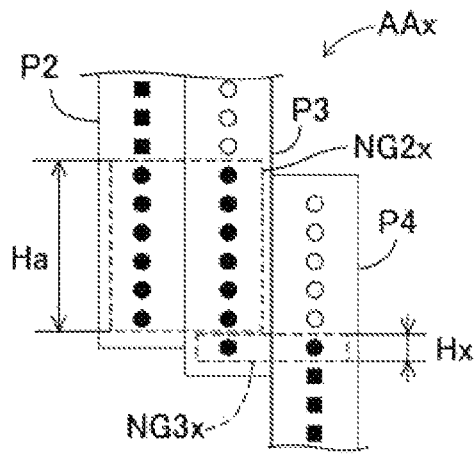

FIGS. 8A and 8B are each a second explanatory view of printing of the first embodiment. FIGS. 9A and 9B are each an explanatory view of printing of the reference embodiment. FIG. 8A indicates the explanatory view, of the present embodiment, which is similar to that of FIG. 5, regarding the case that the position in the conveying direction AR of the head position P2 and the position in the conveying direction AR of the head position P3 which is the end-pressing head position are close to each other. FIG. 9A indicates the explanatory view of the reference embodiment, regarding the case that the position in the conveying direction AR of the head position P2 and the position in the conveying direction AR of the head position P3 which is the end-pressing head position are close to each other.

In the present embodiment of FIG. 8A, since the excess amount VO in the partial printing to be executed at the head position P2 is greater than the upper limit value NSmax, the nozzle shift amount NS of the partial printing to be executed at the head position P3 is set to be the upper limit value NSmax (step S260, Step S270). Further, the shortened amount VS of the used nozzles in the partial printing to be executed at the head position P2 is determined to be the amount (value) greater than 0 (zero) (step S275), corresponding to the nozzle shift amount NS of the partial printing to be executed at the head position P3. Therefore, the length in the conveying direction AR of the area RA3 which is printed by the partial printing executed at the head position P3 will not be excessively small; in the present embodiment, the length in the conveying direction AR of the area RA3 is secured by an amount corresponding to (2×Ha). As a result, both of the length in the conveying direction AR of the end area SA2 and the length in the conveying direction AR of the end area SA3 can be secured each by an amount corresponding to a number (quantity) of nozzle Ha which is to be secured as the length of the end area.

FIG. 8B is an enlarged view of an area AA surrounded by broken lines in FIG. 8A. In FIG. 8B, each of circles and squares indicated inside the head positions P2 to P4 indicates a nozzle NZ. A solid circle indicates a nozzle NZ printing the end area. A square (solid square) indicates a nozzle NZ printing the normal area. A hollow circle indicates a non-used nozzle NZ. A nozzle group NG2 at the head positions P2 and P3 is a nozzle group printing the end area SA2. A nozzle group NG3 at the head positions P3 and P4 is a nozzle group printing the end area SA3. Each of the nozzle groups NG2 and NG3 includes, in the conveying direction AR, the nozzle NZ of which number (quantity) corresponds to the number (quantity) of nozzle Ha (in the present embodiment, 6 pieces) in the conveying direction AR.

A nozzle group NU of hollow circles on the upstream side (−Y side) with respect to the head position P2 is a nozzle group of the upstream-side non-used nozzles. The number (quantity) of the nozzles in the conveying direction AR of the nozzle group NU corresponds to the shortened amount VS. An image as a part of the print image within an area corresponding to the upstream-side non-used nozzles at the head position P2 is printed by the partial printings executed at the head positions P3 and P4, respectively, as depicted in FIG. 8B.

In the reference embodiment, the upper limit value NSmax of the nozzle shift amount NS, and the shortened amount VS are not provided. Due to this, in the reference embodiment, in a case that the excess amount VO is greater than the upper limit value NAmax, the nozzle shift amount NS becomes to be greater than the upper limit value NSmax, as depicted in FIG. 9A. Due to this, in FIG. 9A, the length in the conveying direction AR of the area RA3 printed by the partial printing executed at the head position P3 becomes to be smaller than (2×Ha). As a result, although the length in the conveying direction AR of the end area SA2 is secured by the amount corresponding to the number of nozzle Ha which is to be secured as the length of the end area, the length in the conveying direction AR of the end area SA3 is not secured by the amount corresponding to the number of nozzle Ha.

FIG. 9B is an enlarged view of an area AAx surrounded by broken lines in FIG. 9A. In FIG. 9B, a solid circle indicates a nozzle NZ printing the end area, a square (solid square) indicates a nozzle NZ printing the normal area, and a hollow circle indicates a non-used nozzle NZ, similarly to FIG. 8B. A nozzle group NG2x at the head positions P2 and P3 is a nozzle group printing the end area SA2. A nozzle group NG3x at the head positions P3 and P4 is a nozzle group printing the end area SA3. Although the nozzle group NG2x includes the nozzle NZ of which number (quantity) corresponds to the number (quantity) of nozzle Ha (in the present embodiment, 6 pieces) in the conveying direction AR, the nozzle group N3x includes only the nozzle NZ of which number (quantity) is a number (quantity) of nozzle Hx (in FIG. 9B, 1 (one) piece) in the conveying direction AR which is smaller than the number (quantity) of nozzle Ha.

Note that in the examples of FIGS. 8A and 8B and FIGS. 9A and 9B, respectively, the end area SA2 and the end area SA3 are directly adjacent to each other, and there is not any normal area between the end area SA2 and the end area SA3. As described above, the area RA3 printed by the partial printing executed at the head position P3 includes at least the end area SA2 and the end area SA3, there may be such a case that the area RA3 includes a normal area between the end area SA2 and the end area SA3 (FIG. 5) and also such a case that the area RA3 does not include any normal area between the end area SA2 and the end area SA3 (FIGS. 8A and 8B).

In a case that FIG. 8B and FIG. 9B are compared, in the embodiment of FIG. 8B, the upstream-side non-used nozzle(s) are provided on the upstream side with respect to the head position P2 to thereby shift the nozzle group NG2 printing the end area SA2 is shifted to the downstream side (+Y side) as compared with the reference embodiment. Further, the nozzle shift amount NS is set to be the upper limit value NSmax to thereby reduce the downstream-side non-used nozzle(s) at the head position P3 as compared with the reference embodiment, and thus to increase the number (quantity) of the used nozzles at the head position P3 as compared with the reference embodiment. With this, it is possible to secure the length in the conveying direction AR of the area RA3 (to be) printed by the partial printing executed at the head position P3, by an amount corresponding to (2×Ha). As a result, in the embodiment, it is appreciated that both of the length in the conveying direction AR of the end area SA2 and the length in the conveying direction AR of the end area SA3 can be secured by the amount corresponding to the number (quantity) of nuzzle Ha which are to be secured as the length of the end area.

As described above, in the reference embodiment, since the length in the conveying direction AR of the end area SA3 cannot be sufficiently secured, it is not possible, for example, to execute the printing of an appropriate end area SA3 as explained in FIGS. 7A and 7B. Accordingly, in the reference embodiment, there is such a possibility that a banding might become conspicuous in the end area SA3 of the print image PI. In contrast, in the present embodiment, it is possible to sufficiently secure the length in the conveying direction AR of the end area SA3, since it is possible to execute the printing of an appropriate end area SA3 as explained with reference to FIGS. 7A and 7B, and thus to prevent such a situation that the banding becomes conspicuous in the print image PI.

As appreciated from the foregoing explanation, according to the present embodiment, the CPU 210 makes the shortened amount VS to be 0 (zero) and does not provide the upper-side non-used nozzle(s) (FIG. 5) in the case that the conveying amount TL of the sheet conveyance T2 is not less than the reference value TLth. With this, the CPU 210 determines the range, in the conveying direction AR of the used nozzles in the partial printing to be executed at the head position P2, to be the first range which is same as that in the partial printing to be executed at the head position P1 (FIG. 5). Further, the CPU 210 makes the shortened amount VS to be the value greater than 0 (zero) and provides the upper-side non-used nozzle(s) (FIGS. 8A, 8B) in the case that the conveying amount TL of the sheet conveyance T2 is smaller than the reference value TLth. With this, the CPU 210 determines the range, in the conveying direction AR of the used nozzles in the partial printing to be executed at the head position P2, to be the second range which is smaller than that in the partial printing to be executed at the head position P1 (FIGS. 8A, 8B). The second range is the range which is included in the first range and which does not include the upstream-side non-used nozzle(s), namely the second range is a range which does not include the predetermined range, as the part on the upstream side in the conveying direction AR, of the first range. Further, the image as a part of the print image within an area corresponding to the upstream-side non-used nozzles predetermined range in the head position P2 is printed by the partial printing executed at the head position P3 (FIGS. 8A, 8B).

As a result, it is possible to suppress such a situation that the length in the conveying direction AR of the area RA3 to be printed by the partial printing executed at the head position P3 becomes to be excessively small. Accordingly, since such an inconvenience that the length in the conveying direction AR of the end area SA2 and/or the length in the conveying direction AR of the end area SA3 is/are not be secured can be suppressed, it is possible to suppress the occurrence of such a situation that the banding is conspicuous and thus to improve the image quality of the print image by the printing mechanism 100.

Further, according to the embodiment, as described above, in a case that the conveying amount TL of the sheet conveyance T2 is smaller than the reference value TLth, the CPU 210 makes the shortened amount VS to be greater as the conveying amount TL of the sheet conveyance T2 is smaller. Namely, the CPU 210 makes the range of the upstream-side non-used nozzle(s) to be greater as the conveying amount TL of the sheet conveyance T2 is smaller. As a result, it is possible to appropriately determine the range of the used nozzle(s) at the head position P2, in accordance with the conveying amount TL of the sheet conveyance T2, and thus to appropriately secure the length in the conveying direction AR of the end area SA2 and/or the length in the conveying direction AR of the end area SA3.

Furthermore, according to the present embodiment, as described above, the upper limit value NSmax (D−2×Ha) of the nozzle shift amount NS is set in accordance with the length Ha in the conveying direction AR of the end area. Further, as appreciated from the situation that the shortened amount VS is represented by (VO−NSmax) in the case that the shortened amount VS is a value greater than 0 (zero), the shortened amount Vs is set in accordance with the upper limit value NSmax. From the foregoing, the shortened amount VS is also set in accordance with the length Ha in the conveying direction of the end area. Namely, the CPU 210 determines the range of the upstream-side non-used nozzle(s) in accordance with the length Ha in the conveying direction AR of the end area. Accordingly, it is possible to appropriately secure the length in the conveying direction AR of the end area SA2 and/or the length in the conveying direction AR of the end area SA3, in accordance with the length Ha in the conveying direction AR of the end area which is to be secured.

Moreover, in the present embodiment, as depicted in FIG. 8B, the shortened amount VS of the used nozzles at the head position P2 is determined to be the value obtained by deducting the conveying amount TL of the sheet conveyance T2 from the length Ha in the conveying direction AR of the end area which is to be secured (VS=Ha−TL). With this, it is possible to secure the length in the conveying direction AR of the end area SA3 by an amount corresponding to the length Ha. In a case that the shortened amount VS of the used nozzles at the head position P2 is set to be not less than the value obtained by deducting the conveying amount TL of the sheet conveyance T2 from the length Ha, it is possible to secure the length in the conveying direction AR of the end area SA3 to be not less than the length Ha.

Further, in the print data outputting processing (FIGS. 6A and 6B) of the above-described embodiment, the CPU 210 makes each of a plurality of raster lines sequentially, from the downstream side toward the upstream side in the conveyance direction AR, to be the object of processing, as described above. Then, in a case that the excess amount VO of the interest partial printing is 0 (zero), the CPU 210 determines the conveying amount of the sheet M to be (D−Ha) (steps S255, S265 and S285 of FIG. 6B). Namely, in a case that the partial printing of printing a plurality of raster lines which do not include the raster line on the upstream side with respect to the pressing reference position RL is the interest partial printing, the CPU 210 determines the conveying amount TL of the sheet conveyance after the interest partial printing to be TL=(D−Ha). On the other hand, in a case that the excess amount VO of the interest partial printing is greater than 0 (zero), the CPU 210 determines the conveying amount TL of the sheet M to be a value smaller than (D−Ha) (D−Ha−VO). Namely, in a case that a foremost partial printing, which is the partial printing performed first or foremost among the plurality of partial printings and which is a partial printing of printing a plurality of raster line including the raster line on the upstream side with respect to the pressing reference position RL, is the interest partial printing, the next partial printing should be a partial printing which is to be executed at the end-pressing head position. Accordingly, the conveying amount TL of the sheet conveyance after the foremost partial printing is determined to be the value (D−Ha−VO) which is smaller than (D−Ha), and the shortened amount VS of the foremost partial printing is determined to be the value greater than 0 (zero), as necessary (steps S255 to S280 of FIG. 6B). As a result, it is possible to determine the conveying amount TL and/or the shortened amount VS, by using the pressing reference position RL, so that the partial printing to be executed at the end-pressing head position is appropriately executed.

As appreciated from the foregoing explanation, in the present embodiment, the partial printing executed at the head position P1 is an example of a "first partial printing", the partial printing executed at the head position P2 is an example of a "second partial printing", the partial printing executed at the head position P3 is an example of a "third partial printing", and the partial printing executed at the head position P4 is an example of a "fourth partial printing". The end areas SA1, SA2, SA3 and SA4 are examples, respectively, of a "first end area", a "second end area", a "third end area", and a "fourth end area". The normal areas NA1, NA2, NA3 and NA4 are examples, respectively, of a "first normal area", a "second normal area", a "third normal area", and a "fourth normal area". Further, the conveying amount TL of the sheet conveyance T1 is an example of a "first conveying amount", and the conveying amount TL of the sheet conveyance T2 is an example of a "second conveying amount". Furthermore, the end-pressing head position is an example of a "specified position", and the pressing reference position RL is an example of a "reference position".

B. Second Embodiment

Figure 10:
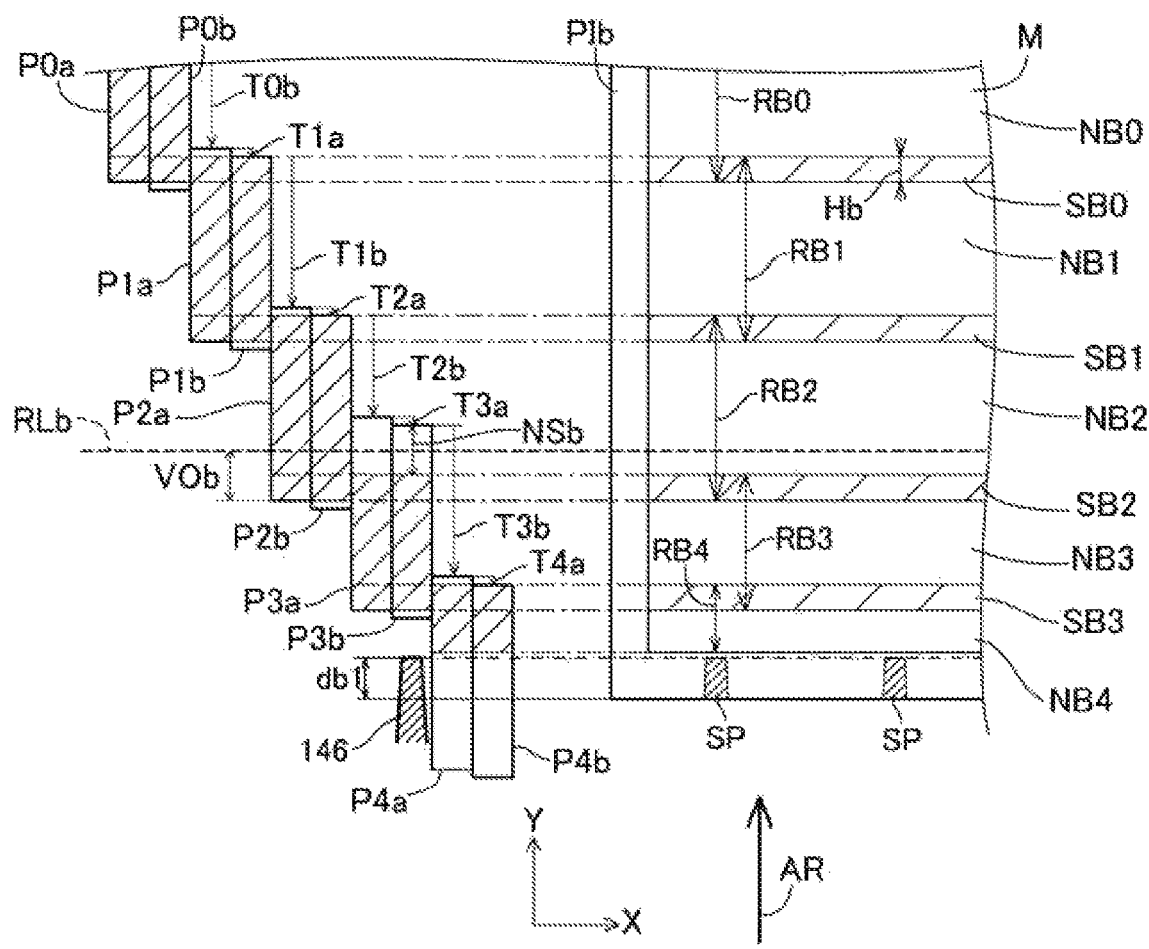
FIG. 10 is a first explanatory view of a multi-pass printing.

FIG. 10 is a first explanatory view of a multi-pass printing. FIG. 10 depicts an example of a print image PIb (to be) printed on a sheet M, and a head position of each of a plurality of partial printings by which the print image PIb is printed. The print image PIb includes a plurality of normal areas (for example, non-hatched areas NB0 to NB4 of FIG. 10), and a plurality of end areas (for example, hatched areas SB0 to SB3 of FIG. 10).

In the first embodiment, each of the normal areas (for example, the areas NA0 to NA4 of FIG. 5) is printed by one time of the partial printing (partial printing performed once, one partial printing) (so-called single pass printing). Namely, in the first embodiment, the plurality of raster lines arranged side by side in one piece of the normal area are printed by one time of the partial printing.

In contrast, in a second embodiment, each of the normal areas (for example, the areas NB0 to NB4 of FIG. 10) is printed by two times of the partial printing (partial printing performed twice, two partial printings) (so-called multi-pass printing). The two partial printings of printing one normal area are referred also to a "partial printing set". For example, the normal area NB0 of FIG. 10 is printed by a partial printing set executed at head positions P0a and P0b. Similarly, the normal areas NB1, NB2, NB3 and NB4 are printed, respectively, by: a partial printing set executed at head positions P1a and P1b, a partial printing set executed at head positions P2a and P2b, a partial printing set executed at head positions P3a and P3b, and a partial printing set executed at head positions P4a and P4b. With this, the print resolution in the conveying direction AR of the print image PIb of the second embodiment becomes two times the print resolution in the conveying direction AR of the print image PI of the first embodiment.

In the second embodiment, two raster lines which are adjacent each other among the plurality of raster lines arranged side by side in the conveying direction AR within the normal area are printed, respectively, by mutually different (two) partial printings. For example, among the plurality of raster lines arranged side by side in the conveying direction AR within a certain normal area, an odd-numbered raster line is printed by a preceding partial printing constructing a partial printing set printing the certain normal area, and an even-numbered raster line is printed by a succeeding partial printing constructing the partial printing set printing the certain normal area.

Sheet conveyances T1a, T2a, T3a and T4a are each a sheet conveyance which is executed between two partial printings constructing one partial printing set. A conveying amount of each of the sheet conveyances T1a, T2a, T3a and T4a is a minute or fine conveying amount ΔTL, for example, a conveying amount corresponding to a minute odd number (quantity) (in the second embodiment, three pieces) of the raster line. Usable nozzles of the preceding partial printing constructing the partial printing set are nozzles NZ which are included in a plurality of pieces of the nozzle NZ corresponding to the nozzle length D and of which number (quantity) is obtained by deducting, from the plurality of nozzles NZ corresponding to the nozzle length D, a certain number (quantity) of (in the second embodiment, one piece) the nozzle NZ on the downstream side (+Y side) in accordance with the minute conveying amount ATL. Usable nozzles of the succeeding partial printing constructing the partial printing set are nozzles NZ which are included in the plurality of pieces of the nozzle NZ corresponding to the nozzle length D and of which number (quantity) is obtained by deducting, from the plurality of nozzles NZ corresponding to the nozzle length D, a certain number (quantity) of (in the second embodiment, one piece) the nozzle NZ on the upstream side (−Y side) in accordance with the minute conveying amount ΔTL.

The sheet conveyance T0b is a sheet conveyance performed after the partial printing set executed at the head positions P0a and P0b. The sheet conveyances T1b, T2b and T3b are, respectively, a sheet conveyance performed after the partial printing set executed at the head positions P1a and P1b, a sheet conveyance performed after the partial printing set executed at the head positions P2a and P2b, and a sheet conveyance performed after the partial printing set executed at the head positions P3a and P3b.

The area RB0 printed by the partial printing set executed at the head positions P0a and P0b includes a normal area NB0 and an end area SB0 which is on the upstream side (−Y side) with respect to the normal area NB0. The area RB1 printed by the partial printing set executed at the head positions P1a and P1b includes a normal area NB1, the end area SB0 which is on the downstream side (+Y side) with respect to the normal area NB1, and an end area SB1 which is on the upstream side (−Y side) with respect to the normal area NB1. The area RB2 printed by the partial printing set executed at the head positions P2a and P2b includes a normal area NB2, the end area SB1 which is on the downstream side (+Y side) with respect to the normal area NB2, and an end area SB2 which is on the upstream side (−Y side) with respect to the normal area NB2. The area RB3 printed by the partial printing set executed at the head positions P3a and P3b includes a normal area NB3, the end area SB2 which is on the downstream side (+Y side) with respect to the normal area NB3, and an end area SB3 which is on the upstream side (−Y side) with respect to the normal area NB3. The area RB4 printed by the partial printing set executed at the head positions P4a and P4b includes a normal area NB4, and the end area SB3 which is on the downstream side (+Y side) with respect to the normal area NB4.

Each of the raster lines in the end area is printed by two partial printing sets. For example, in each of the raster lines of the end area SB1 of FIG. 10, dots are formed by both of one partial printing constructing the partial printing set executed at the head positions P1a, P1b and one partial printing constructing the partial printing set executed at the head positions P2a, P2b. The length Hb in the conveying direction AR of the end area (FIG. 10) is, for example, 3 (three) to several tens, as the number (quantity) of the nozzle (the number (quantity) of the raster line) of the partial printing set as a unit; in the second embodiment, the length Hb is 8 (8 pieces).

In the second embodiment, a partial printing set which is included in the plurality of partial printing sets and which is different from the last partial printing set is performed in a state that the sheet M is pressed by the pressing members 146. The last partial printing set is performed in a state that the sheet M is not pressed by the pressing members 146. A succeeding partial printing constructing the penultimate partial printing set immediately before the last partial printing set is performed at the end-pressing head position. In the example of FIG. 10, the penultimate partial printing set immediately before the last partial printing set is the partial printing set executed at the head positions P3a and p3b. Accordingly, the head position P3b is the end-pressing head position.

In the second embodiment, in a case that a foremost partial printing set, which is the partial printing set performed first or foremost among the plurality of partial printing sets and which is a first partial printing set of printing a plurality of raster lines including a raster line positioned at the upstream side with respect to a pressing reference position RLb (FIG. 10) is the interest partial printing set, a partial printing set to be performed next to the interest partial printing set is the partial printing set including the partial printing executed at the end-pressing head position. Therefore, a conveying amount TLb of the sheet conveyance after the interest partial printing set is determined so that the succeeding partial printing constructing the next partial printing set, which is to be executed after the interest partial printing set, is performed at the end-pressing head position. With this, the conveying amount TLb of the sheet conveyance after the interest partial printing set becomes shorter than the conveying amount TLb of the sheet conveyance of the succeeding partial printing of another partial printing set. Further, in the partial printing set including the partial printing executed at the end-pressing head position, a nozzle shift amount NSb becomes to be greater than 0 (zero).

In the example of FIG. 10, the conveying amount TLb of the sheet conveyance T2b after the partial printing set executed at the head positions P2a, P2b becomes shorter than those in the sheet conveyances T0b, T1b and T3b. The nozzle shift amount NSb of the partial printing set executed at the head positions P3a, P3b is made to be a value greater than 0 (zero), in accordance with an excess amount VOb.

In the example of FIG. 10, the CPU 210 determines the target conveying amount of the conveying amount TLb of the sheet conveyance T2b so that the head position P3b of the succeeding partial printing constructing the next partial printing set becomes to be the end-pressing head position. Similarly to the first embodiment, in a case that the target conveying amount of the sheet conveyance T2b is not less than a referenced value TLbth, the CPU 210 determines a shortened amount VSb at the head positions P2a and P2b to be 0 (zero), and the CPU 210 does not provide the upstream-side non-used nozzles at the head positions P2a and P2b (FIG. 10). Further, as will be described later on, in a case that the target conveying amount of the sheet conveyance T2b is smaller than the reference value TLbth, the CPU 210 determines the shortened amount VSb at the head positions P2a and P2b to be a value greater than 0 (zero), and the CPU 210 provides the upstream-side non-used nozzles at the head positions P2a and P2b. With this, also in the second embodiment, it is possible to suppress such a situation that the length in the conveying direction AR of the area RB3 which is printed by the partial printing set executed at the head positions P3a, P3b becomes to be excessively small. As a result, both of the length in the conveying direction AR of the end area SB2 and the length in the conveying direction AR of the end area SB3 can be secured each by an amount corresponding to the number of nozzle Hb which is to be secured as the length of the end area.

In the example of FIG. 10, the position in the conveying direction AR of the head position P2b and the position in the conveying direction AR of the head position P3a are relatively apart, and thus the conveying amount TLb is greater than the reference value TLbth and the excess amount VO is smaller than the upper limit value NSbmax. Due to this, in the example of FIG. 10, the nozzle shift amount NSb at the head positions P3a and P3b is smaller than the upper limit value NSbmax. Further, the shortened amount VSb at the head positions P2a and P2b is made to be 0 (zero), and the upstream-side non-used nozzles are not provided on the head positions P2a and P2b.

Figure 11A:
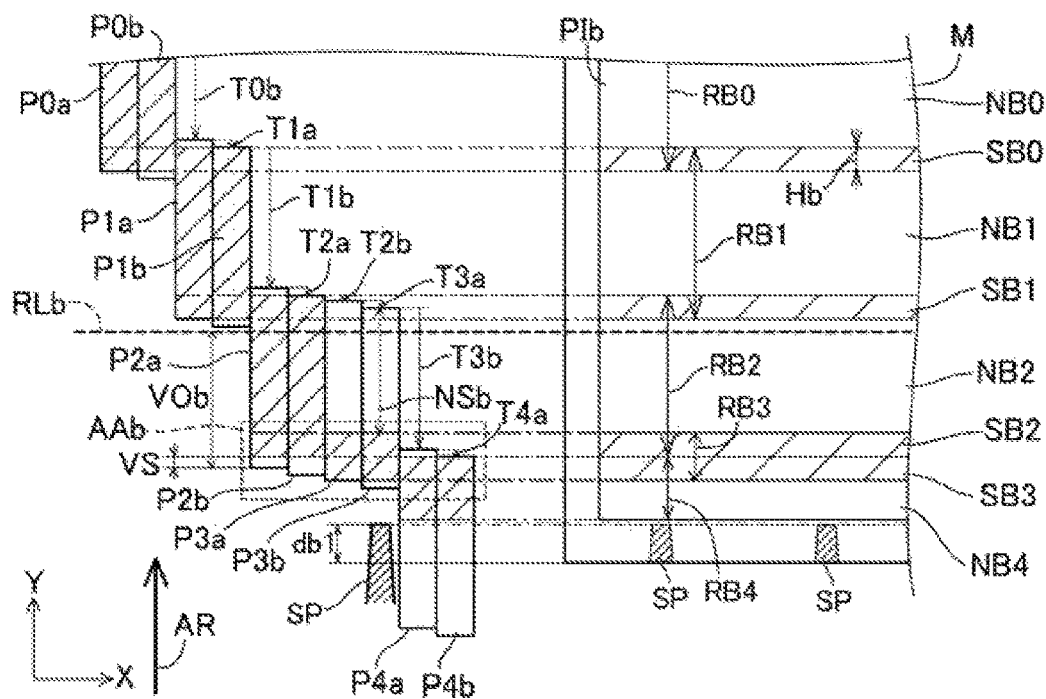
FIGS. 11A and 11B are each a second explanatory view of the multi-pass printing.
Figure 11B:
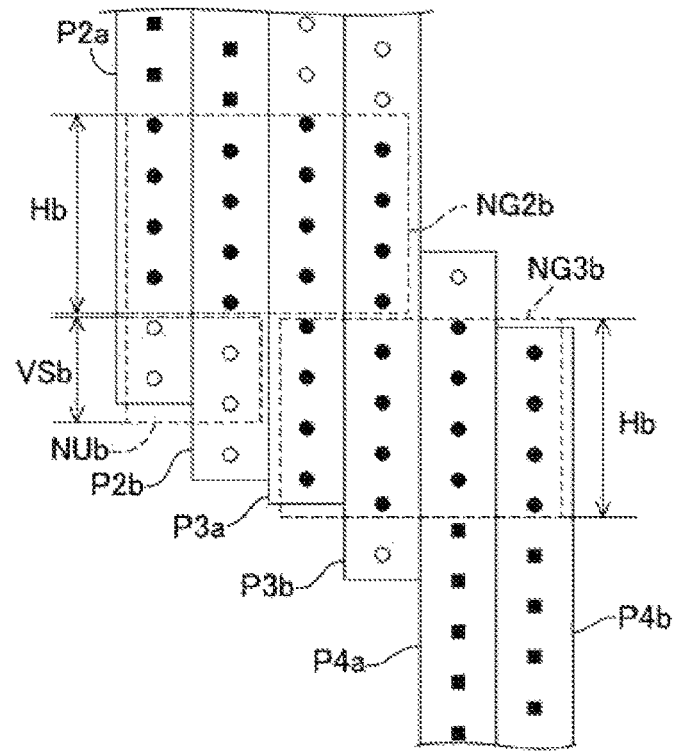
Figure 12A:
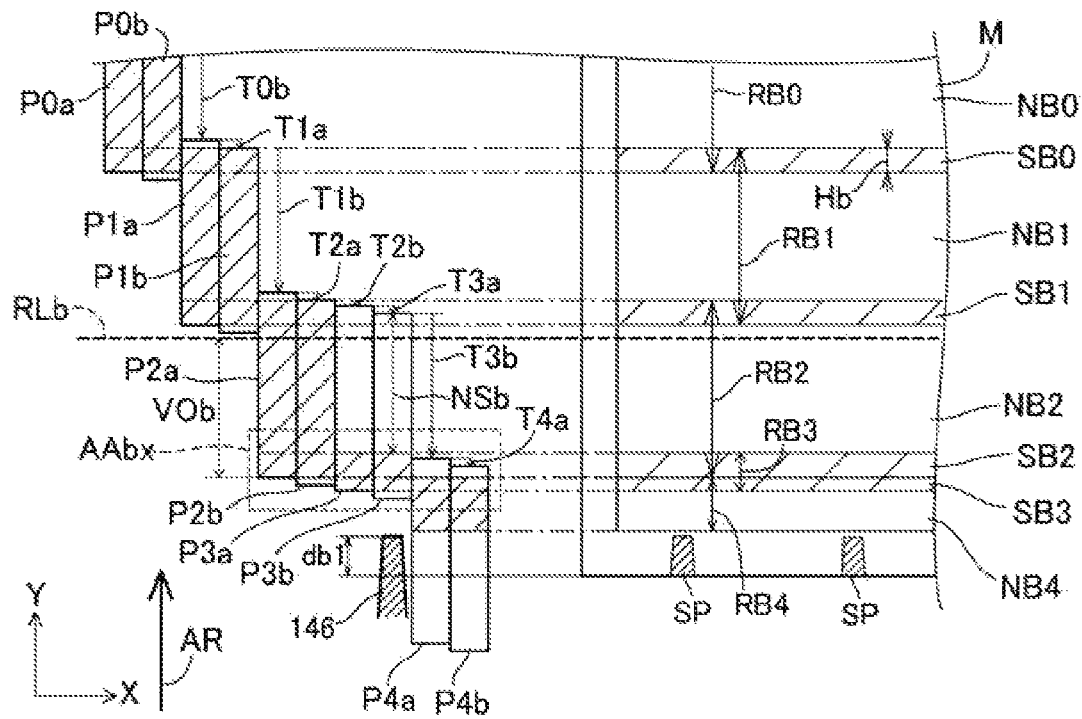
FIGS. 12A and 12B are each an explanatory view of printing of a reference embodiment.
Figure 12B:
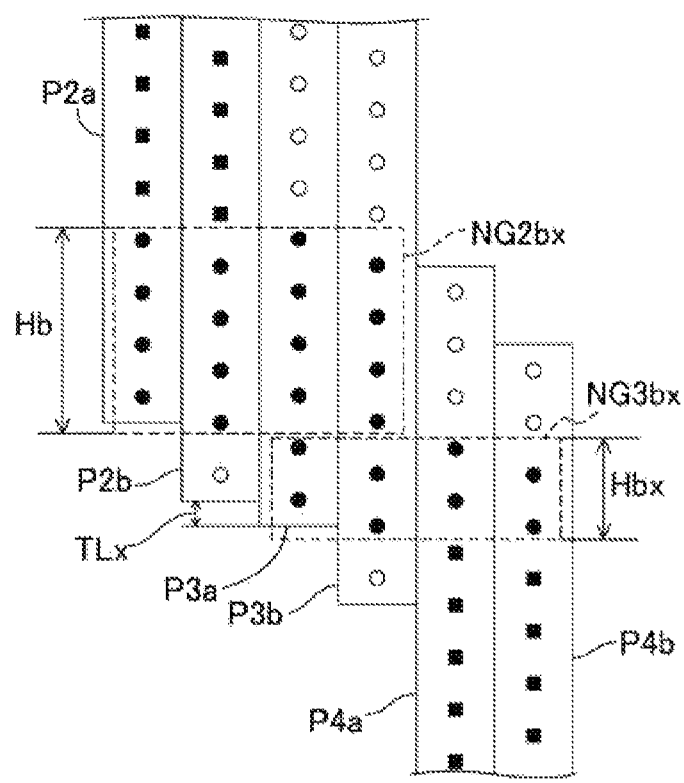

Here, similarly to the first embodiment, since the position in the conveying direction AR of the head position P2b varies due to, for example, a margin on the downstream side of the print image PIb (the +Y side in FIG. 10), etc., there is such a case that the position in the conveying direction AR of the head position P2b and the position in the conveying direction AR of the head position P3a are close to each other. In the following, an explanation will be given while comparing the second embodiment and the reference embodiment. FIGS. 11A and 11B are each a second explanatory view of printing of the multi-pass printing. FIGS. 12A and 12B are each an explanatory view of printing of the reference embodiment. FIG. 11A indicates the explanatory view, of the second embodiment, which is similar to that of FIG. 10, regarding the case that the position in the conveying direction AR of the head position P2b and the position in the conveying direction AR of the head position P3a are close to each other. FIG. 12A indicates the explanatory view of the reference embodiment, regarding the case that the position in the conveying direction AR of the head position P2b and the position in the conveying direction AR of the head position P3a are close to each other.

In the present embodiment of FIG. 11A, the conveying amount TLb of the sheet conveyance T2b after the partial printing which is executed at the head position P2b is smaller than the reference value TLbth, and the excess amount VO is greater than the upper limit value NSbmax. Accordingly, in the example of FIG. 11A, the nozzle shift amount NSb at the head positions P3a and P3b is set to be the upper limit value NSbmax. Further, the shortened value VSb at the head positions P2a and P2b is made to be the value greater than 0 (zero), and the upstream-side non-used nozzles are provided on the head positions P2a and P2b.

FIG. 11B is an enlarged view of an area AAb surrounded by broken lines in FIG. 11A. In FIG. 11B, a solid circle indicated within the head position indicates a nozzle NZ printing the end area, a square (solid square) indicated within the head position indicates a nozzle NZ printing the normal area, a hollow circle indicated within the head position indicates a non-used nozzle NZ. As depicted in FIG. 11B, a nozzle group NUb of the upstream-side non-used nozzles corresponding to the shortened amount VSb is provided at the head positions P2a and P2b. A nozzle group NG2b at the head positions P2a, P2b, P3a and P3b is a nozzle group printing the end area SB2. A nozzle group NG3b at the head positions P3a, P3b, P4a and P4b is a nozzle group printing the end area SB3. The head shift amount NSb at the head positions P3a and P3b is set to be the upper limit value NSbmax, and the nozzle group NUb of the upstream-side non-used nozzles is provided on the head positions P2a and P2b, and thus the length in the conveying direction AR of the area RB3 printed by the partial printing set to be executed at the head positions P3a and P3b will not be excessively small. It is appreciated, with this, that the length in the conveying direction AR of each of the nozzle groups NG2b and NG3b can be secured by a value which corresponds to the number (quantity) of nozzle Hb (in the present embodiment, 4 pieces) in the conveying direction AR.

In the reference embodiment, the concepts of the upper limit value NSbmax of the nozzle shift amount NSb and the shortened amount VSb of the used nozzles are not introduced. Due to this, the upper limit value is not set with respect to the nozzle shift amount NSb at the head positions P3a and P3b and/or the upstream-side non-used nozzles are not provided on the head positions P2a and P2b. In the reference embodiment of FIG. 12A, the conveying amount TL of the sheet conveyance T2b after the partial printing executed at the head position P2b is smaller than the reference value TLbth, and the excess amount VO is greater than the upper limit value NSbmax. In this case also, in the reference embodiment, the nozzle shift amount NSb at the head positions P3a and P3b is set to be the excess amount VO, and the upstream-side non-used nozzles are not provided on the head positions P2a and P2b.

Due to this, the length in the conveying direction AR of the area RB3 which is printed by the partial printing set executed at the head positions P3a and P3b will be excessively small. As a result, although the length in the conveying direction AR of the end area SB2 can be secured by the amount corresponding to the number of nozzle Hb which is to be secured as the length of the end area, the length in the conveying direction AR of the end area SB3 cannot be secured by the amount corresponding to the number of nozzle Hb.

FIG. 12B is an enlarged view of an area AAbx surrounded by broken lines in FIG. 12A. In FIG. 12B, a solid circle indicates a nozzle NZ printing the end area, a square (solid square) indicates a nozzle NZ printing the normal area, and a hollow circle indicates a non-used nozzle NZ, similarly to FIG. 11B. A nozzle group NG2bx at the head positions P2a, P2b, P3a and P3b is a nozzle group printing the end area SB2. A nozzle group NG3bx at the head positions P3a, P3b, P4a and P4b is a nozzle group printing the end area SB3. Although the nozzle group NG2bx includes the nozzle NZ of which number (quantity) corresponds to the number (quantity) of nozzle Hb (in FIG. 12B, 4 pieces in the present reference embodiment) in the conveying direction AR, the nozzle group NG3bx includes only the nozzle NZ of which number (quantity) is a number (quantity) of nozzle Hbx (in FIG. 12B, 2 pieces) in the conveying direction AR which is smaller than the number of nozzle Hb.

As appreciated from the foregoing explanation, in the reference embodiment, since the length in the conveying direction AR of the end area SB3 cannot be sufficiently secured, it is not possible to appropriately execute the printing of the end area SB3. Accordingly, in the reference embodiment, there is such a possibility that a banding might become conspicuous in the end area SB3 of the print image PIb. In contrast, in the present embodiment, it is possible to sufficiently secure the length in the conveying direction AR of the end area SB3, it is possible to appropriately execute the printing of the end area SB3, and thus to prevent such a situation that the banding becomes conspicuous in the print image PIb.

As appreciated from the foregoing explanation, the two partial printings executed at the head position P1a, P1b in the present embodiment are an example of the "first partial printing", the two partial printings executed at the head positions P2a, P2b are an example of the "second partial printing", the two partial printings executed at the head position P3a, P3b are an example of the "third partial printing", and the two partial printings executed at the head positions P4a, P4b are an example of the "fourth partial printing". Further, the end areas SB1, SB2, SB3 and SB4 are examples, respectively, of the "first end area", the "second end area", the "third end area" and the "fourth end area". The normal areas NB1, NB2, NB3 and NB4 are examples, respectively, of the "first normal area", the "second normal area", the "third normal area", and the "fourth normal area". Furthermore, the conveying amount TLb of the sheet conveyance T1b is an example of the "first conveying amount", and the conveying amount TLb of the sheet conveyance T2b is an example of the "second conveying amount".

C. Modifications

In the above-described second embodiment, one partial printing set is constructed of two partial printings. Instead of this, it is allowable that one partial printing set is constructed of not less than two partial printings, for example, three or four partial printings. Generally, one partial printing set may be constructed of N times (N is an integer not less than 2). In such a case, N pieces of raster line which are included in the plurality of raster lines arranged side by side in the conveying direction within each of the normal areas and which are adjacent to each other are printed, respectively, by mutually different (N times of) partial printings which are included in one partial printing set.

The printing processing in FIG. 4 and the print data outputting processing in FIGS. 6A and 6B are each an example, and the present disclosure is not limited to or restricted by these. For example, in the processing in each of FIG. 4 and FIGS. 6A, 6B, the entirety of the image data is converted into the print data (step S130 of FIG. 4), and then the print data outputting processing of FIGS. 6A and 6B is executed. Instead of this, it is allowable for example that the conversion of the print data is executed every time that the raster data is obtained in the processing of step S200 of FIG. 6A, with respect to each of the obtained raster data. Further, in the print data outputting processing, the raster data is allocated sequentially to the usable nozzles, and every time the allocation regarding one partial printing is completed, a group of allocated raster data is outputted as partial print data for one partial printing. Instead of this, it is allowable that the print data is divided and to generate a plurality of pieces of partial print data for all of the partial printings, and that after determining the conveying amounts for all of the sheet conveyances, the output of the plurality of pieces of partial print data for all of the partial printings and the output of the data of the conveying amounts are performed.

As the medium, another medium different from the sheet M, such as, for example, a film for OHP, a CD-ROM, a DVD-ROM, etc., may be adopted, instead of the sheet M.

In each of the above-described embodiments, the controller configured to execute the printing process in FIG. 4 is the CPU 210. Instead of this, the controller may be a device or apparatus of a different kind, for example, the terminal device 300 of a user. In such a case, for example, the terminal device 300 executes a driver program so as to function as a printer driver, and executes, as a part of the function as the printer driver, the printing process in FIG. 4. In such a case, the terminal device 300 causes the printer 200, as the printing part, to execute the printing by, for example, supplying the partial print data and the conveying amount data to the printer 200.

The controller configured to execute the printing process in FIG. 4 may be a server which obtains image data from the printer 200 and/or the terminal device 300, and to generate the partial print data and/or the conveying amount data as described above by using the obtained image data, and which transmits these pieces of the data to the printer 200. Such a server may be a plurality of calculators which are capable of communicating with each other via a network.

In each of the above-described embodiments, a part of the configuration realized by a hardware may be replaced by a software; on the contrary to this, a part or the entirety of the configuration realized by a software may be replaced with a hardware. For example, a processing or processings as a part of the print processing of FIG. 4 may be realized by a dedicated hardware circuit (for example, an ASIC) which is operated by an instruction from the CPU 210.

In the foregoing, although the present disclosure has been explained based on the embodiments and the modifications, the embodiments of the present disclosure are provided for the purpose that the present disclosure can be easily understood, and is not intended to limit or restrict the present disclosure in any way. The present disclosure may be changed and/or improved without deviating from the gist and spirit of the present disclosure and the scope of the claims, and may encompasses any equivalent thereof.

What is claimed is:

1. A printer, comprising:
  a printing part including:
    a conveyor configured to convey a medium in a conveying direction;
    a printing head having a plurality of nozzles from which an ink of a specified color is discharged and of which positions in the conveying direction are mutually different, the printing head being configured to discharge the ink from the plurality of nozzles to the medium so as to form dots in the medium; and
    a facing member configured to be capable of facing a print surface of the medium on an upstream side in the conveying direction with respect to the plurality of nozzles of the printing head; and
  a controller configured to cause the printing part to execute a partial printing of forming the dots by the printing head and a conveyance of the medium by the conveyor alternately and a plurality of times to thereby cause the printing part to print a print image,
  wherein in a case that the controller causes the printing part to print the print image, the controller is configured to execute:
    causing the printing head to execute a first partial printing not less than one time, the first partial printing being the partial printing executed in a state that the medium faces the facing member;
    causing the conveyor to convey the medium by a first conveying amount, after causing the printing head to execute the first partial print not less than one time;
    causing the printing head to execute a second partial printing not less than one time, after causing the conveyor to convey the medium by the first conveying amount, the second partial printing being the partial printing executed in the state that the medium faces the facing member;
    causing the conveyor to convey the medium by a second conveying amount, which is smaller than the first conveying amount, after causing the printing head to execute the second partial print not less than one time;
    causing the printing head to execute a third partial printing not less than one time, after causing the conveyor to convey the medium by the second conveying amount, the third partial printing being the partial printing executed in a state that the medium is arranged at a specified position in the conveying direction at which a predetermined position, of an end part on the upstream side in the conveying direction of the medium, faces the facing member;

causing the conveyor to convey the medium, after causing the printing head to execute the third partial printing not less than one time; and after causing the conveyor to convey the medium, causing the printing head to execute a fourth partial printing not less than one time, the fourth partial printing being the partial printing executed in a state that the medium does not face the facing member, wherein a first area printed by the first partial printing includes a first normal area which is printed only by the first partial printing, and a first end area which is arranged on the upstream side in the conveying direction with respect to the first normal area and which is printed by both of the first partial printing and the second partial printing, wherein a second area printed by the second partial printing includes the first end area, a second normal area which is arranged on the upstream side in the conveying direction with respect to the first end area and which is printed only by the second partial printing, and a second end area which is arranged on the upstream side in the conveying direction with respect to the second normal area and which is printed by both of the second partial printing and the third partial printing, wherein a third area printed by the third partial printing includes the second end area and a third end area which is arranged on the upstream side in the conveying direction with respect to the second end area and which is printed by both of the third partial printing and the fourth partial printing, wherein a fourth area printed by the fourth partial printing includes the third end area and a fourth normal area which is arranged on the upstream side in the conveying direction with respect to the third end area and which is printed only by the fourth partial printing, wherein the controller is configured to execute:
  in a case that the second conveying amount is not less than a reference, determining a used nozzle range in the second partial printing to be a first range which is same as the used nozzle range in the first partial printing; and
  in a case that the second conveying amount is smaller than the reference, determining the used nozzle range in the second partial printing to be a second range which is smaller than the first range, wherein the used nozzle range is a range in the conveying direction including nozzles, among the plurality of nozzles, which are used in the partial printing, the second range is a range not including a predetermined range which is a part on the upstream side in the conveying direction of the first range, and wherein an image as a part of the print image within an area corresponding to the predetermined range in the second partial printing is printed by the third partial printing.

2. The printer according to claim 1, wherein the third area includes a third normal area which is arranged between the second end area and the third end area and which is printed only by the third partial printing.

3. The printer according to claim 1, wherein in the case that the second conveying amount is smaller than the reference, the controller is configured to make the predetermined range to be greater as the second conveying amount is smaller.

4. The printer according to claim 1, wherein in the case that the second conveying amount is smaller than the reference, the controller is configured to determine the predetermined range in accordance with a length in the conveying direction of the first end area.

5. The printer according to claim 1, wherein a number of times of each of the first partial printing, the second partial printing, the third partial printing and the fourth partial printing is one time,
  wherein a plurality of first raster lines which are within the first normal area and which are arranged in the conveying direction are printed by one time of the first partial printing,
  wherein a plurality of second raster lines which are within the second normal area and which are arranged in the conveying direction are printed by one time of the second partial printing,
  wherein a plurality of third raster lines which are within the third normal area and which are arranged in the conveying direction are printed by one time of the third partial printing, and
  wherein a plurality of fourth raster lines which are within the fourth normal area and which are arranged in the conveying direction are printed by one time of the fourth partial printing.

6. The printer according to claim 5, wherein the controller is configured to determine the predetermined range to be not less than a value obtained by deducting the second conveying amount from a length in the conveying direction of the first end area.

7. The printer according to claim 1, wherein a number of times of each of the first partial printing, the second partial printing, the third partial printing and the fourth partial printing is N times (N being an integer not less than 2),
  wherein N pieces of a first raster line, which are adjacent to each other and which are included in a plurality of first raster lines within the first normal area and arranged in the conveying direction, are printed, respectively, by the first partial printing and the first partial printing which are mutually different from each other and performed separately from each other,
  wherein N pieces of a second raster line, which are adjacent to each other and which are included in a plurality of second raster lines within the second normal area and arranged in the conveying direction, are printed, respectively, by the second partial printing and the second partial printing which are mutually different from each other and performed separately from each other,
  wherein N pieces of a third raster line, which are adjacent to each other and which are included in a plurality of third raster lines within the third normal area and arranged in the conveying direction, are printed, respectively, by the third partial printing and the third partial printing which are mutually different from each other and performed separately from each other, and
  wherein N pieces of a fourth raster line, which are adjacent to each other and which are included in a plurality of fourth raster lines within the fourth normal area and arranged in the conveying direction, are printed, respectively, by the fourth partial printing and the fourth partial printing which are mutually different from each other and performed separately from each other.

8. The printer according to claim 1, wherein the print image includes a plurality of raster lines which are arranged in the conveying direction;

the controller is configured to execute:

generating, by using input image data, print data indicating the print image and including a plurality of pieces of raster data each of which corresponds to one of the plurality of raster lines; and causing the printing part to execute printing of the print image, by using the print data;

in a case that the controller outputs the print data to the printing part, making one raster line among the plurality of raster lines, to be a target of processing, sequentially from a downstream side toward the upstream side in the conveying direction;

determining a conveying amount, by which the medium is to be conveyed after the partial printing performed to print raster lines, among the plurality of raster lines, which do not include a raster line which is on the upstream side in the conveying direction with respect to a reference position, to be the first conveying amount;

determining a conveying amount, by which the medium is to be conveyed after a foremost partial printing, which is the partial printing performed first to print raster lines, among the plurality of raster lines, including the raster line on the upstream side in the conveying direction with respect to the reference position, to be the second conveying amount; and determining the used nozzle range of the foremost partial printing to be either one of the first range and the second range, and wherein the reference position is a position which is determined based on the specified position, and is a position in the conveying direction in the medium.

9. The printer according to claim 1, further comprising a carriage configured to mount the printing head thereon, and to scan with respect to the medium in a scanning direction orthogonal to the conveying direction, wherein the controller is configured to execute the partial printing by causing the printing head to discharge the ink to the medium while causing the carriage to scan in the scanning direction.

10. A non-transitory, computer-readable medium storing a program for a controller configured to control a printing part, the printing part including:

a conveyor configured to convey a medium in a conveying direction;

a printing head having a plurality of nozzles from which an ink of a specified color is discharged and of which positions in the conveying direction are mutually different, the printing head being configured to discharge the ink from the plurality of nozzles to the medium so as to form dots in the medium; and a facing member configured to be capable of facing a print surface of the medium on an upstream side in the conveying direction with respect to the plurality of nozzles of the printing head, wherein the program causing a computer of the controller to realize printing of a print image by the printing part, by causing the printing part to execute a partial printing of forming the dots by the printing head and a conveyance of the medium by the conveyor alternately and a plurality of times, wherein in a case that the program causes the printing part to print the print image, the program causing:

the printing head to execute a first partial printing not less than one time, the first partial printing being the partial printing executed in a state that the medium faces the facing member;

the conveyor to convey the medium by a first conveying amount, after causing the printing head to execute the first partial print not less than one time;

the printing head to execute a second partial printing not less than one time, after causing the conveyor to convey the medium by the first conveying amount, the second partial printing being the partial printing executed in the state that the medium faces the facing member;

the conveyor to convey the medium by a second conveying amount, which is smaller than the first conveying amount, after causing the printing head to execute the second partial print not less than one time;

the printing head to execute a third partial printing not less than one time, after causing the conveyor to convey the medium by the second conveying amount, the third partial printing being the partial printing executed in a state that the medium is arranged at a specified position in the conveying direction at which a predetermined position, of an end part on the upstream side in the conveying direction of the medium, faces the facing member;

the conveyor to convey the medium, after causing the printing head to execute the third partial printing not less than one time; and after causing the conveyor to convey the medium, the printing head to execute a fourth partial printing not less than one time, the fourth partial printing being the partial printing executed in a state that the medium does not face the facing member, wherein a first area printed by the first partial printing includes a first normal area which is printed only by the first partial printing, and a first end area which is arranged on the upstream side in the conveying direction with respect to the first normal area and which is printed by both of the first partial printing and the second partial printing, wherein a second area printed by the second partial printing includes the first end area, a second normal area which is arranged on the upstream side in the conveying direction with respect to the first end area and which is printed only by the second partial printing, and a second end area which is arranged on the upstream side in the conveying direction with respect to the second normal area and which is printed by both of the second partial printing and the third partial printing, wherein a third area printed by the third partial printing includes the second end area and a third end area which is arranged on the upstream side in the conveying direction with respect to the second end area and which is printed by both of the third partial printing and the fourth partial printing, wherein a fourth area printed by the fourth partial printing includes the third end area and a fourth normal area which is arranged on the upstream side in the conveying direction with respect to the third end area and which is printed only by the fourth partial printing, wherein the program causes:
- in a case that the second conveying amount is not less than a reference, the computer of the controller to realize determination of a used nozzle range in the second partial printing to be a first range which is same as the used nozzle range in the first partial printing; and
- in a case that the second conveying amount is smaller than the reference, the computer of the controller to realize determination of the used nozzle range in the second partial printing to be a second range which is smaller than the first range, wherein the used nozzle range is a range in the conveying direction including nozzles, among the plurality of nozzles, which are used in the partial printing, wherein the second range is a range not including a predetermined range which is a part on the upstream side in the conveying direction of the first range, and wherein an image as a part of the print image within an area corresponding to the predetermined range in the second partial printing is printed by the third partial printing.

11. The non-transitory, computer-readable medium according to claim 10, wherein the third area includes a third normal area which is arranged between the second end area and the third end area and which is printed only by the third partial printing.

* * * * *